(12) United States Patent
Kiyokami et al.

(10) Patent No.: US 9,446,760 B2
(45) Date of Patent: Sep. 20, 2016

(54) VEHICLE DRIVE DEVICE

(75) Inventors: Hiroaki Kiyokami, Toyota (JP);
Norihiro Yamamura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 166 days.

(21) Appl. No.: 14/366,600

(22) PCT Filed: Dec. 20, 2011

(86) PCT No.: PCT/JP2011/079565
§ 371 (c)(1),
(2), (4) Date: Jun. 18, 2014

(87) PCT Pub. No.: WO2013/094029
PCT Pub. Date: Jun. 27, 2013

(65) Prior Publication Data
US 2015/0031487 A1    Jan. 29, 2015

(51) Int. Cl.
| | |
|---|---|
| B60W 10/06 | (2006.01) |
| B60W 10/08 | (2006.01) |
| B60W 10/115 | (2012.01) |
| B60W 20/00 | (2016.01) |
| B60K 6/365 | (2007.10) |
| B60K 6/445 | (2007.10) |
| B60W 30/188 | (2012.01) |
| B60W 10/196 | (2012.01) |
| B60K 6/38 | (2007.10) |

(52) U.S. Cl.
CPC ............ *B60W 20/108* (2013.01); *B60K 6/365* (2013.01); *B60K 6/445* (2013.01); *B60W 10/06* (2013.01); *B60W 10/08* (2013.01); *B60W 10/196* (2013.01); *B60W 20/20* (2013.01); *B60W 30/1882* (2013.01); *B60K 2006/381* (2013.01); *Y02T 10/6239* (2013.01); *Y02T 10/6286* (2013.01); *Y10S 903/93* (2013.01); *Y10S 903/947* (2013.01)

(58) Field of Classification Search
None
See application file for complete search history.

(56) References Cited

U.S. PATENT DOCUMENTS

| | | | |
|---|---|---|---|
| 2002/0094898 A1 | 7/2002 | Hata et al. | |
| 2007/0173373 A1* | 7/2007 | Kinugasa | B60K 6/36 477/3 |

(Continued)

FOREIGN PATENT DOCUMENTS

| | | |
|---|---|---|
| JP | 2002-274201 A | 9/2002 |
| JP | 2005-029027 A | 2/2005 |

(Continued)

*Primary Examiner* — Edwin A Young
(74) *Attorney, Agent, or Firm* — Dinsmore & Shohl LLP

(57) ABSTRACT

A vehicle drive device having a control device making another first planetary gear device constituent member and a second planetary gear device constituent member non-rotatable by a brake to perform electric motor running for running with power of a second electric motor while an engine is put into a non-drive state, when the engine is started during the electric motor running the control device causing a first electric motor to rotate the engine while the other first planetary gear device constituent member and the one second planetary gear device constituent member are kept non-rotatable by the brake, and when the brake is released after start of the engine, the control device controlling the first electric motor before release of the brake so a torque applied to the brake due to power of the engine reaches a magnitude balancing with a torque applied to the brake due to a running load.

4 Claims, 16 Drawing Sheets

(56) References Cited

U.S. PATENT DOCUMENTS

| | | | |
|---|---|---|---|
| 2007/0207887 A1* | 9/2007 | Ueda | F16H 1/48 475/5 |
| 2008/0093137 A1* | 4/2008 | Maeda | B60K 6/40 180/65.265 |
| 2009/0227409 A1* | 9/2009 | Ito | B60K 6/445 475/5 |
| 2010/0081533 A1* | 4/2010 | Lee | B60K 6/445 475/5 |

FOREIGN PATENT DOCUMENTS

| | | |
|---|---|---|
| JP | 2006-288122 A | 10/2006 |
| JP | 2010-125900 A | 6/2010 |

* cited by examiner

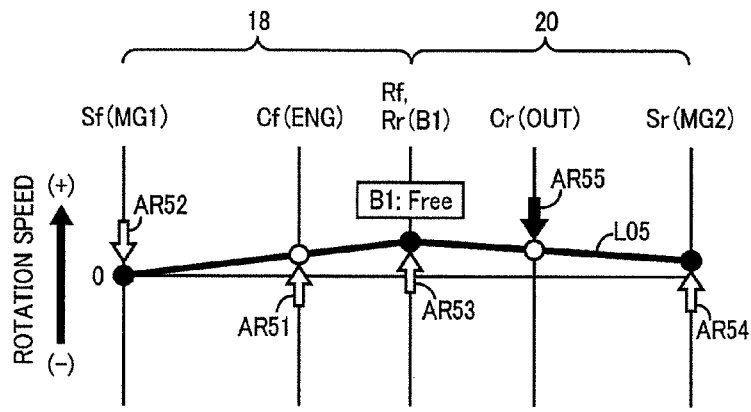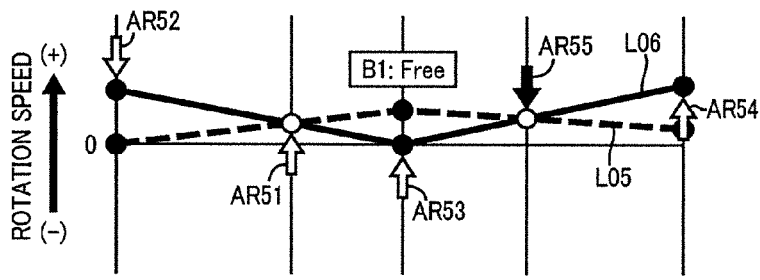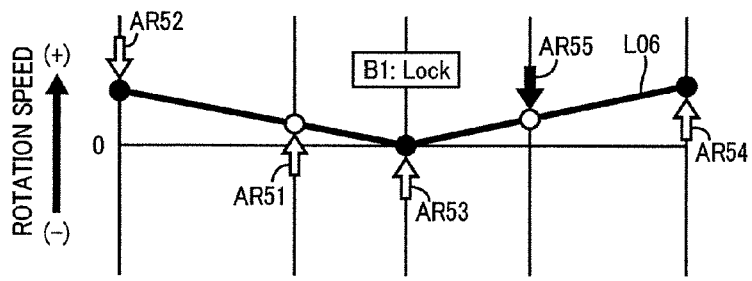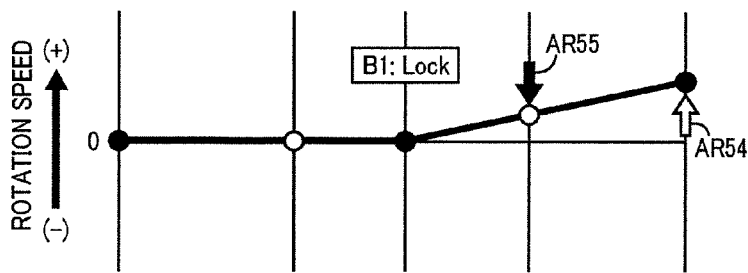

VEHICLE DRIVE DEVICE

TECHNICAL FIELD

The present invention relates to a vehicle drive device having an engine and two electric motors.

BACKGROUND ART

A vehicle drive device is conventionally known that includes an engine, a first electric motor, and a second electric motor. For example, this corresponds to a vehicle drive device described in Patent Document 1. In the vehicle drive device of Patent Document 1, the engine is coupled to drive wheels through a differential mechanism having a differential state controlled by the first electric motor, and the second electric motor is coupled to the drive wheels through a speed reduction mechanism with a constant reduction ratio.

PRIOR ART DOCUMENTS

Patent Documents

Patent Document 1: Japanese Laid-Open Patent Publication No. 2002-274201
Patent Document 2: Japanese Laid-Open Patent Publication No. 2010-125900

SUMMARY OF THE INVENTION

Problem to be Solved by the Invention

Assuming that an engine rotation speed is constant in the vehicle drive device of Patent Document 1, when a vehicle speed is higher, a rotation speed of the second electric motor becomes higher and a rotation speed of the first electric motor becomes lower. Therefore, the first electric motor may rotate in the negative direction during running at high speed. In this case, power circulation occurs, causing the first electric motor to act as a motor rather than an electric generator and the second electric motor to act as an electric generator so as to transmit power of the engine to the drive wheels. The vehicle drive device of Patent Document 1 may generate the power circulation in this way and has a problem of deterioration in vehicle fuel efficiency due to the power circulation.

The present invention was conceived in view of the situations and it is therefore an object of the present invention to provide a vehicle drive device including an engine, a first electric motor, and a second electric motor and capable of achieving favorable vehicle fuel efficiency.

Means for Solving the Problem

To achieve the object, the first aspect of the invention provides (a) a vehicle drive device having an engine, a first electric motor, and a second electric motor comprising: (b) a first planetary gear device including a first sun gear, a first ring gear, and a first carrier coupled to the engine; and a second planetary gear device including a second sun gear, a second ring gear, and a second carrier coupled to drive wheels, (c) one first planetary gear device constituent member of the first sun gear and the first ring gear being coupled to the first electric motor, the other first planetary gear device constituent member of the first sun gear and the first ring gear being coupled to one second planetary gear device constituent member of the second sun gear and the second ring gear, the other second planetary gear device constituent member of the second sun gear and the second ring gear being coupled to the second electric motor.

Effects of the Invention

Consequently, even when engine rotation speed and rotation speed of the first electric motor are constant, rotation speed of the second electric motor can be changed to arbitrarily control a vehicle speed. Therefore, since an operating point of the first electric motor can freely be controlled regardless of the vehicle speed and the engine rotation speed even during vehicle running at high vehicle speed and, for example, the first electric motor can be maintained in positive rotation regardless of the vehicle speed and the engine rotation speed, an occurrence of power circulation causing the first electric motor to act as a motor and the second electric motor to act as an electric generator can be reduced. As a result, favorable fuel efficiency of the vehicle can be acquired. The fuel efficiency refers to, for example, a running distance per unit fuel consumption and improvement in fuel efficiency refers to extension of the running distance per unit fuel consumption, or a decrease in fuel consumption rate (=fuel consumption/drive wheel output) of the vehicle as a whole. Contrarily, reduction (deterioration) in fuel efficiency refers to shortening of the running distance per unit fuel consumption or an increase in fuel consumption rate of the vehicle as a whole.

The second aspect of the invention provides the vehicle drive device recited in the first aspect of the invention comprising a brake suppressing rotation of the other first planetary gear device constituent member and rotation of the one second planetary gear device constituent member. Consequently, in the vehicle drive device, when the actuation of the brake makes the other first planetary gear device constituent member and the one second planetary gear device constituent member non-rotatable, respective independent controls can be provided on the engine side and the second electric motor side. For example, the so-called series hybrid running can be performed.

The third aspect of the invention provides the vehicle drive device recited in the second aspect of the invention including a control device making the other first planetary gear device constituent member and the one second planetary gear device constituent member non-rotatable by the brake to perform electric motor running for running with power of the second electric motor while the engine is put into a non-drive state. Consequently, for example, as compared to a hybrid vehicle etc., unable to stop the engine during vehicle running, an improvement in fuel efficiency of the vehicle can easily be achieved.

The fourth aspect of the invention provides the vehicle drive device recited in the third aspect of the invention, wherein the control device makes the other first planetary gear device constituent member and the one second planetary gear device constituent member non-rotatable by the brake to perform series hybrid running for running with power of the second electric motor while the first electric motor generates electricity from power of the engine without power of the engine being mechanically transmitted to the drive wheels. Consequently, an improvement in fuel efficiency of the vehicle can be achieved by making the other first planetary gear device constituent member and the one second planetary gear device constituent member non-rotatable by the brake in a running state in which favorable fuel efficiency can be acquired from the series hybrid running The fifth aspect of the invention provides the vehicle drive device recited in the third or fourth aspect of the invention, wherein the control device releases the brake to perform parallel hybrid running for running with power of the engine and the second electric motor. Consequently, an improvement in fuel efficiency of the vehicle can be achieved by releasing the brake in a running state in which favorable fuel efficiency can be acquired from the parallel hybrid running.

The sixth aspect of the invention provides the vehicle drive device recited in the third aspect of the invention, wherein when the engine is started during the electric motor running, the control device causes the first electric motor to rotate the engine while the other first planetary gear device constituent member and the one second planetary gear device constituent member are kept non-rotatable by the brake. Consequently, an influence of a series of controls provided at the engine start on the vehicle speed or the drive force of the vehicle can easily be interrupted by the brake. For example, since the control device does not have to control the second electric motor for cranking of the engine and can perform the cranking of the engine through control of the first electric motor, the engine rotation speed can easily be controlled during the cranking.

The seventh aspect of the invention provides the vehicle drive device recited in the sixth aspect of the invention, wherein when the brake is released after start of the engine, the control device controls the first electric motor before release of the brake such that a torque applied to the brake due to power of the engine reaches a magnitude balancing with a torque applied to the brake due to a running load. Consequently, the shock that may occur when the brake is released can be reduced.

The eighth aspect of the invention provides the vehicle drive device recited in the fifth aspect of the invention, wherein if the engine is stopped during the parallel hybrid running, the control device controls the first electric motor and the second electric motor such that a rotation speed of the other first planetary gear device constituent member and the one second planetary gear device constituent member comes closer to zero, then actuates the brake to make the other first planetary gear device constituent member and the one second planetary gear device constituent member non-rotatable, and stops the engine after completion of actuation of the brake. Consequently, the control device can reduce the shock from the brake that may occur when the brake is actuated such that the brake makes the other first planetary gear device constituent member and the one second planetary gear device constituent member non-rotatable, and the shock that may occur when the engine is switched from the drive state to the non-drive state.

Preferably, if torque of the second electric motor is equal to or less than a predefined second electric motor torque determination value during the parallel hybrid running, the control device slips the brake.

Preferably, the first electric motor, the first planetary gear device, the second planetary gear device, and the second electric motor are disposed in order from the side closer to the engine on the same axis as an output shaft of the engine.

Preferably, the other first planetary gear device constituent member and the one second planetary gear device constituent member are relatively non-rotatably coupled.

Preferably, (a) a collinear diagram of the first planetary gear device has a first rotating element, a second rotating element, and a third rotating element of the first planetary gear device arranged in this order; (b) a collinear diagram of the second planetary gear device has a first rotating element, a second rotating element, and a third rotating element of the second planetary gear device arranged in this order; (c) the first rotating element of the first planetary gear device is coupled to the first electric motor; the second rotating element of the first planetary gear device is coupled to the engine; the third rotating element of the first planetary gear device is coupled to the third rotating element of the second planetary gear device; the first rotating element of the second planetary gear device is coupled to the second electric motor; and the second rotating element of the second planetary gear device is coupled to the drive wheels. Specifically, the first rotating element of the first planetary gear device is the first sun gear; the second rotating element of the first planetary gear device is the first carrier; the third rotating element of the first planetary gear device is the first ring gear; the first rotating element of the second planetary gear device is the second sun gear; the second rotating element of the second planetary gear device is the second carrier; and the third rotating element of the second planetary gear device is the second ring gear.

BRIEF DESCRIPTION OF THE DRAWINGS

FIG. 18 is a diagram for explaining control of switching a running mode of the vehicle from the parallel HV running to the EV running during the parallel HV running in forward running at low vehicle speed in the hybrid vehicle of FIG. 1 and (a) to (d) in FIG. 18 are collinear diagrams of the first planetary gear device and the second planetary gear device arranged in time series.

MODE FOR CARRYING OUT THE INVENTION

An example of the present invention will now be described in detail with reference to the drawings.

EXAMPLE

Figure 1:
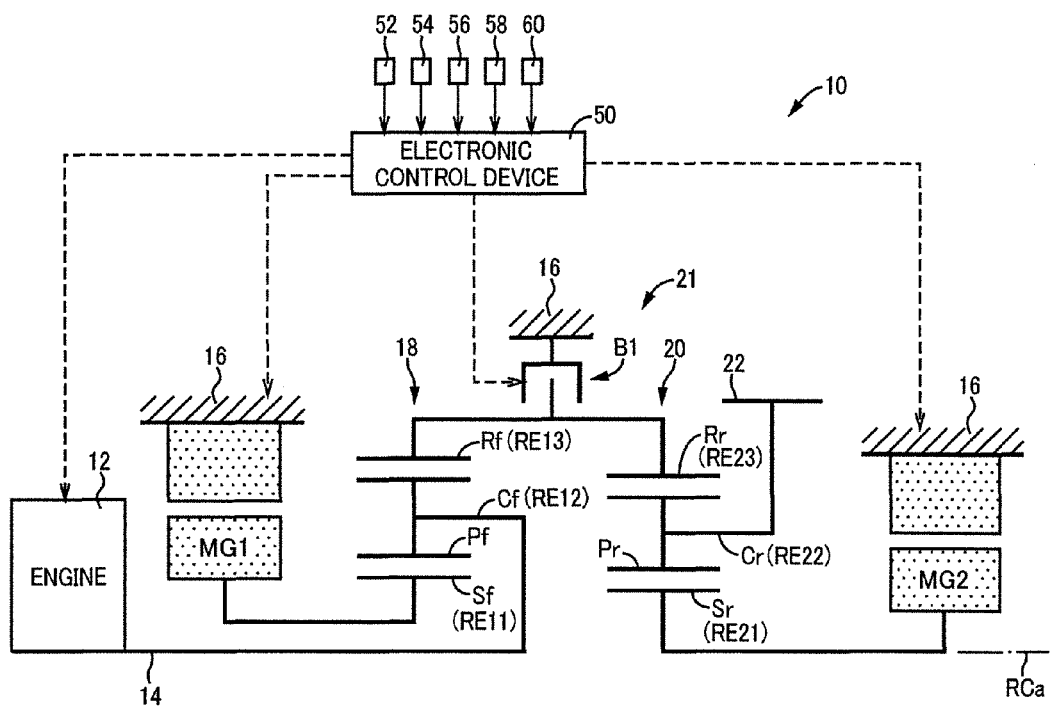
FIG. 1 is a skeleton diagram for explaining a vehicle drive device included in a hybrid vehicle to which the present invention is applied.
Figure 2:
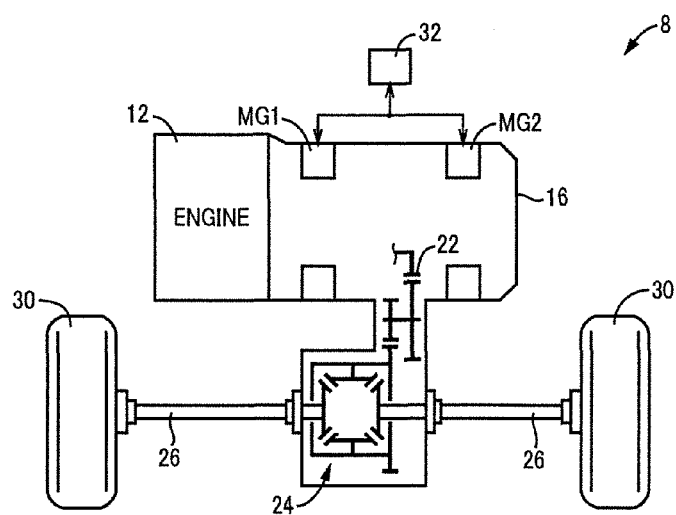
FIG. 2 is a diagram of a power transmission path from the vehicle drive device of FIG. 1 to drive wheels.

FIG. 1 is a skeleton diagram for explaining a vehicle drive device 10 included in a hybrid vehicle 8 (hereinafter referred to as a vehicle 8) to which the present invention is applied. FIG. 2 is a diagram of a power transmission path from the vehicle drive device 10 to drive wheels 30. The portions mutually common to the drawings are denoted by the same reference numerals and will not be described.

As depicted in FIG. 1, the vehicle drive device 10 includes an engine 12 that is a generally known internal combustion engine such as a gasoline engine or a diesel engine, a transaxle case 16 (hereinafter referred to as a case 16) as a non-rotating member attached to a vehicle body by bolts etc., and an electronic control device 50. The vehicle drive device 10 also includes in the case 16 acting as a housing of the vehicle drive device 10 a first electric motor MG1, a first planetary gear device 18, a second planetary gear device 20, and a second electric motor MG2 in order from the side closer to the engine 12 on the same axis (axis RCa) as an output shaft (crankshaft) 14 of the engine 12. The vehicle drive device 10 also includes a brake B1 in the case 16. The first planetary gear device 18, the second planetary gear device 20, and the brake B1 make up a power transmission device 21. In FIG. 1, the first electric motor MG1, the first planetary gear device 18, the second planetary gear device 20, the second electric motor MG2, an output gear 22, etc. are symmetrically configured relative to the axis RCa and are therefore depicted without depicting the lower side from the axis RCa.

The first planetary gear device 18 makes up a portion of a power transmission path between the engine 12 and drive wheels 30 (see FIG. 2) and is disposed closer to the engine than the second planetary gear device 20 in the power transmission path. The first planetary gear device 18 is an electric differential mechanism outputting power of the engine 12 to the drive wheels 30 and having a differential state controlled by the first electric motor MG1 and acts as a power dividing mechanism dividing the power of the engine 12 to the first electric motor MG1 and the power transmission path to the drive wheels 30. Specifically, the first planetary gear device 18 is a single pinion type planetary gear device and includes a first sun gear Sf, a first pinion gear Pf, a first carrier Cf supporting the first pinion gear Pf in a rotatable and revolvable manner, and a first ring gear Rf meshed via the first pinion gear Pf with the first sun gear Sf.

In the first planetary gear device 18, the first sun gear Sf is a first rotating element RE11 of the first planetary gear device 18 and is coupled to the first electric motor MG1; the first carrier Cf is a second rotating element RE12 and is coupled to the engine 12, or particularly, to the output shaft 14 of the engine 12; and the first ring gear Rf is a third rotating element RE13 and is coupled to a second ring gear Rr of the second planetary gear device 20. In FIG. 1, the first sun gear Sf corresponds to one first planetary gear device constituent member of the present invention and the first ring gear Rf corresponds to the other first planetary gear device constituent member of the present invention.

The second planetary gear device 20 makes up a portion of the power transmission path between the engine 12 and drive wheels 30 (see FIG. 2) and is disposed closer to the drive wheels than the first planetary gear device 18 in the power transmission path. Specifically, the second planetary gear device 20 is a single pinion type planetary gear device and includes a second sun gear Sr, a second pinion gear Pr, a second carrier Cr supporting the second pinion gear Pr in a rotatable and revolvable manner, and the second ring gear Rr meshed via the second pinion gear Pr with the second sun gear Sr.

In the second planetary gear device 20, the second sun gear Sr is a first rotating element RE21 of the second planetary gear device 20 and is coupled to the second electric motor MG2, and the second carrier Cr is a second rotating element RE22 and is coupled to the output gear 22. As depicted in FIG. 2, the output gear 22 is coupled to a pair of the drive wheels 30 sequentially through a differential gear device 24, a pair of axles 26, etc. Therefore, the second carrier Cr is coupled to the power transmission path to the drive wheels 30. In short, the second carrier Cr is coupled to the drive wheels 30. The second planetary gear device 20 configured in this way can continuously vary a gear ratio between the second ring gear Rr and the second carrier Cr with the second electric motor MG2. In other words, when the second ring gear Rr and the second carrier Cr are defined as an input member and an output member, respectively, in the second planetary gear device 20, the second planetary gear device 20 can be considered as an electric continuously variable transmission mechanism (electric CVT mechanism) continuously varying the gear ratio between the input member and the output member with the second electric motor MG2. The second ring gear Rr is a third rotating element RE23 of the second planetary gear device 20. The first ring gear Rf of the first planetary gear device 18 and the second ring gear Rr of the second planetary gear device 20 are relatively non-rotatably coupled, and the first ring gear Rf and the second ring gear Rr are considered to make up an intermediate transmission member transmitting power between the first planetary gear device 18 and the second planetary gear device 20 as a whole. In FIG. 1, the second ring gear Rr corresponds to one second planetary gear device constituent member of the present invention and the second sun gear Sr corresponds to the other second planetary gear device constituent member of the present invention.

Both the first electric motor MG1 and the second electric motor MG2 are, for example, three-phase synchronous electric motors and are motor generators having a function of a motor generating power and a function of a generator (electric generator) generating a reaction force. Each of the first electric motor MG1 and the second electric motor MG2 is electrically connected to an electric storage device 32 via an inverter etc. Therefore, the first electric motor MG1, the second electric motor MG2, and the electric storage device 32 are configured to be capable of giving/receiving electric power to/from each other. The electric storage device 32 is made up of, for example, a battery (secondary battery) such as a lead storage battery or a capacitor.

The brake B1 is made up of a generally known wet multi-plate type hydraulic friction engagement device and is actuated by a command from the electronic control device 50. The brake B1 is interposed between the case 16 and the first ring gear Rf/the second ring gear Rr and selectively couples the case 16 to the first ring gear Rf and the second ring gear Rr. Therefore, the brake B1 is engaged to suppress rotation of the first ring gear Rf and rotation of the second ring gear Rr. For example, the brake B1 is put into an engaged state (completely engaged state) to make the first ring gear Rf and the second ring gear Rr non-rotatable. In other words, the brake B1 prevents the first ring gear Rf and the second ring gear Rr from rotating. On the other hand, the brake B1 is put into a released state to make the first ring gear Rf and the second ring gear Rr rotatable. In other words, the brake B1 permits free rotation of the first ring gear Rf and the second ring gear Rr. The brake B1 can be put into a slip state (half-clutch state) to apply a braking force while permitting the rotation of the first ring gear Rf and the second ring gear Rr.

If the brake B1 is released in the vehicle drive device 10 configured as described above, the power of the engine 12 input to the first carrier Cf of the first planetary gear device 18 is transmitted from the first carrier Cf sequentially through the first ring gear Rf, the second ring gear Rr, the second carrier Cr, the output gear 22, the differential gear device 24, the axles 26, etc. to the drive wheels 30. If the brake B1 is engaged, the second planetary gear device 20 acts as a reduction gear with a constant reduction ratio and, for example, power of the second electric motor MG2 input to the second sun gear Sr is transmitted from the second sun gear Sr sequentially through the second carrier Cr, the output gear 22, the differential gear device 24, the axles 26, etc. to the drive wheels 30.

The electronic control device 50 includes a so-called microcomputer and is a control device providing vehicle control such as hybrid drive control related to the engine 12, the first electric motor MG1, the second electric motor MG2, and the brake B1. The electronic control device 50 is supplied from sensors and switches disposed on the vehicle 8 with, for example, a signal indicative of an engine rotation speed Ne detected by an engine rotation speed sensor 52, a signal indicative of a rotation speed Nout of the output gear 22 (hereinafter referred to as an output rotation speed Nout) detected by an output rotation speed sensor 54, a signal indicative of a rotation speed Ng of the first electric motor MG1 (hereinafter referred to as a first electric motor rotation speed Ng) detected by a first electric motor rotation speed sensor 56, a signal indicative of a rotation speed Nm of the second electric motor MG2 (hereinafter referred to as a second electric motor rotation speed Nm) detected by a second electric motor rotation speed sensor 58, a signal from a throttle valve opening degree sensor 60 indicative of a throttle opening degree θth of an electronic throttle value disposed in an intake pipe of the engine 12 to electrically adjust an intake air amount of the engine 12, etc. Since the output rotation speed Nout corresponds to a vehicle speed V, the output rotation speed sensor 54 also acts as a vehicle speed sensor.

The electronic control device 50 outputs various control signals for controlling the engine 12, the first electric motor MG1, the second electric motor MG2, the brake B1, etc. For example, in a drive state of the engine 12, the electronic control device 50 controls the engine 12 and the first electric motor MG1 such that an operating point of the engine 12 is located on a fuel efficiency optimum line that is an engine operating curve empirically set in advance such that the best fuel efficiency can be acquired depending on an engine output.

During running of the vehicle 8, the electronic control device 50 selectively performs electric motor running (also referred to as "EV running"), series hybrid running (sometimes abbreviated as "series HV running"), and parallel hybrid running (sometimes abbreviated as "parallel HV running") based on, for example, the vehicle speed V and an accelerator opening degree Acc in accordance with a relationship (running mode map) empirically defined in advance such that both fuel efficiency performance and running performance are satisfied. The EV running means running with the power of the second electric motor MG2 while the engine 12 is put into a non-drive state. The series HV running means running with the power of the second electric motor MG2 while the first electric motor MG1 generates electricity from the power of the engine 12 without mechanically transmitting the power of the engine 12 to the drive wheels 30. The parallel HV running means running with the power of the engine 12 and the second electric motor MG2. An operating state of the vehicle drive device 10 in each of the EV running, the series HV running, and the parallel HV running will be described with reference to collinear diagrams depicted in FIGS. 3 to 17. All the collinear diagrams (FIGS. 3 to 17) are collinear diagrams of the first planetary gear device 18 and the second planetary gear device 20. A correlation between the vehicle state etc. and the collinear diagrams is described in Table 1 and description will be made in order in accordance with Table 1. Vertical lines of the collinear diagrams of FIGS. 3 to 17 respectively correspond to the first sun gear Sf, the first carrier Cf, the first ring gear Rf and the second ring gear Rr, the second carrier Cr, and the second sun gear Sr from the left side of the figures, and the positive directions of rotation speed and torque (indicated by arrows) are the upward direction of the figures. ENG in parentheses denotes the engine 12 and OUT in parentheses denotes the output gear 22.

TABLE 1

Figure 3:
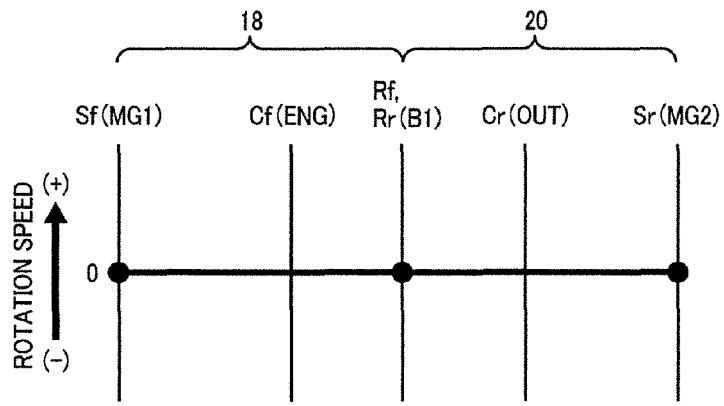
FIG. 3 is a collinear diagram when an engine is in a non-drive state while the hybrid vehicle of FIG. 1 is stopped.
Figure 4:
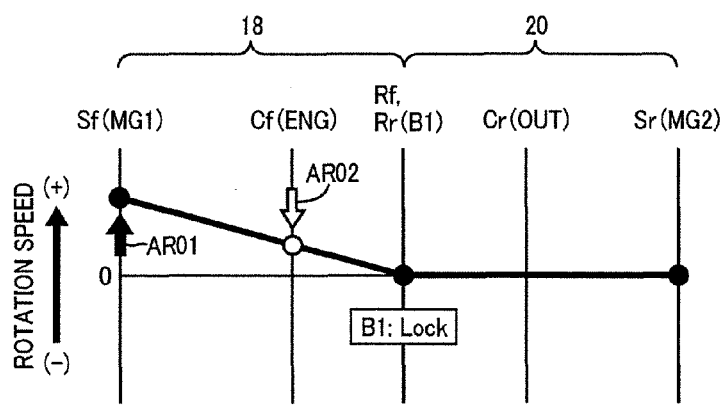
FIG. 4 is a collinear diagram when the engine is started during stop in the hybrid vehicle of FIG. 1.
Figure 5:
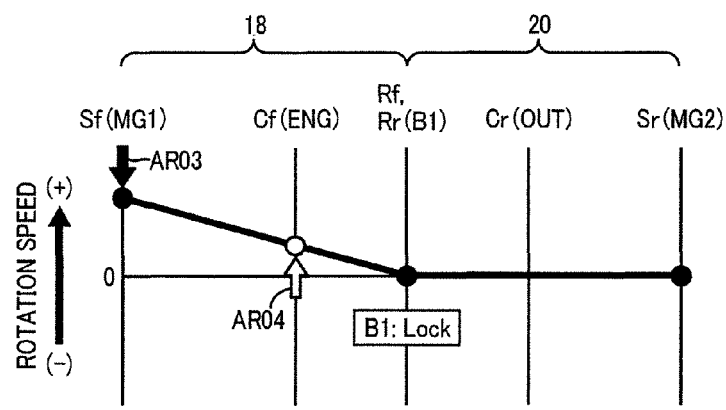
FIG. 5 is a collinear diagram when electricity is generated from power of the engine during stop in the hybrid vehicle of FIG. 1.
Figure 6:
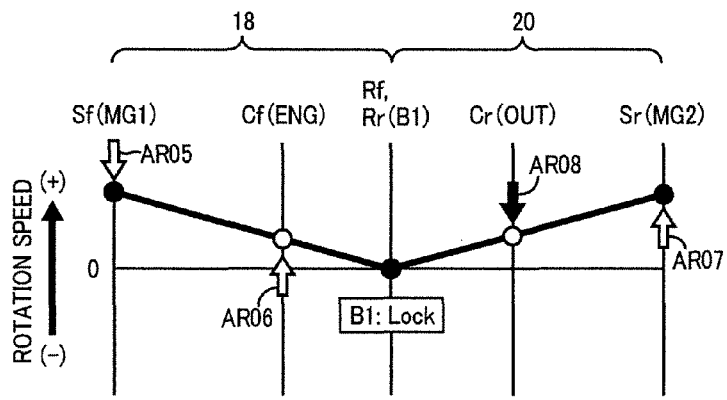
FIG. 6 is a collinear diagram when series HV running is performed in the hybrid vehicle of FIG. 1.
Figure 7:
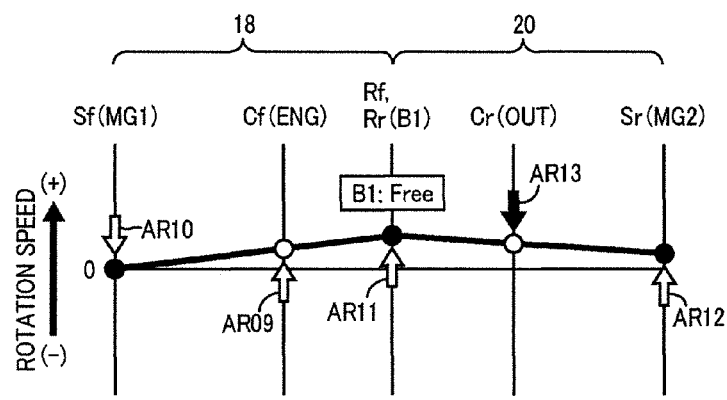
FIG. 7 is a collinear diagram when parallel HV running is performed in forward running at low vehicle speed in the hybrid vehicle of FIG. 1.
Figure 8:
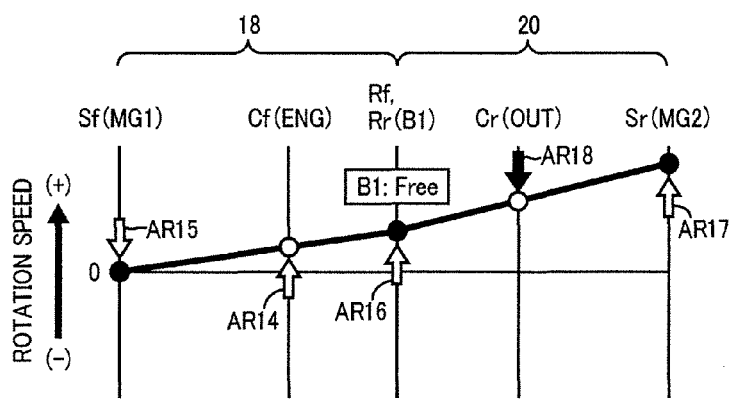
FIG. 8 is a collinear diagram when the parallel HV running is performed in forward running at high vehicle speed in the hybrid vehicle of FIG. 1.
Figure 9:
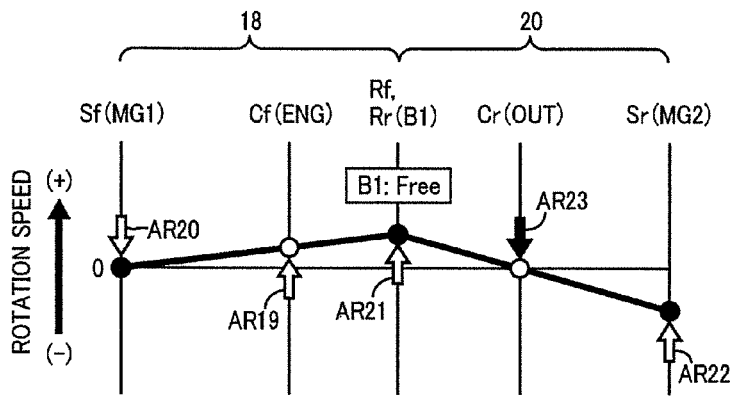
FIG. 9 is a collinear diagram when the vehicle is started in the parallel HV running of the hybrid vehicle of FIG. 1.
Figure 10:
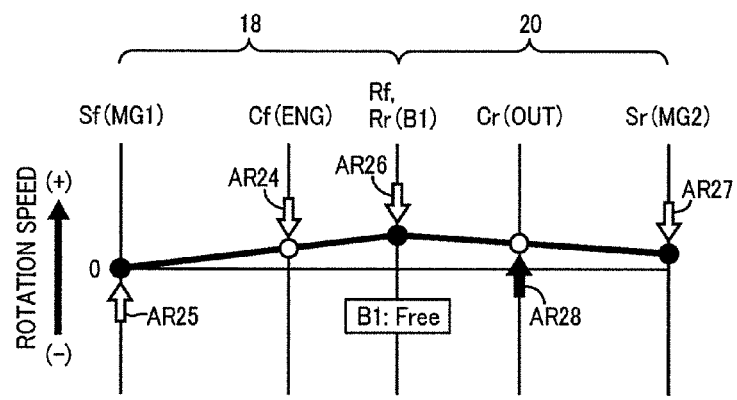
FIG. 10 is a collinear diagram when a reverse drive force from the drive wheels is regenerated in the parallel HV running of the hybrid vehicle of FIG. 1.
Figure 11:
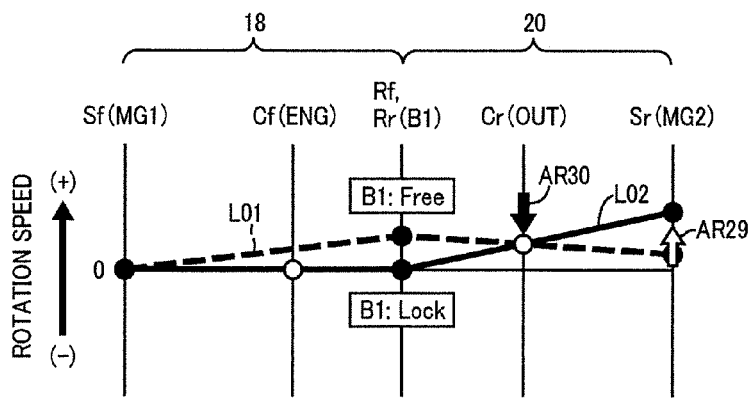
FIG. 11 is a collinear diagram for explaining the case of stopping the engine during the parallel HV running in the hybrid vehicle of FIG. 1 to make a shift from the parallel HV running to EV running.
Figure 12:
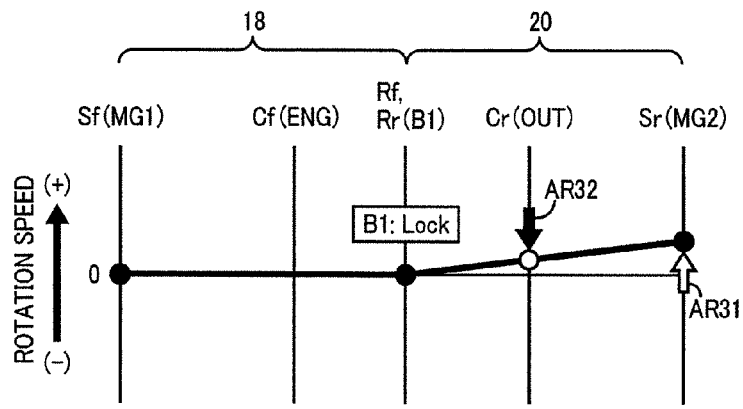
FIG. 12 is a collinear diagram when the EV running is performed in the hybrid vehicle of FIG. 1.
Figure 13:
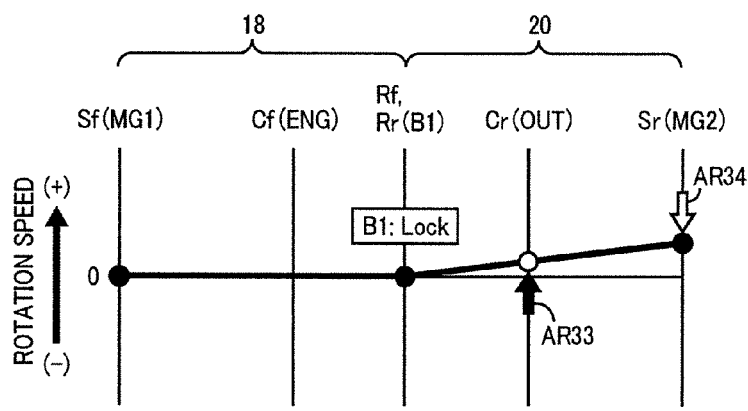
FIG. 13 is a collinear diagram when a second electric motor MG2 is regeneratively operated during the EV running of the hybrid vehicle of FIG. 1.
Figure 14:
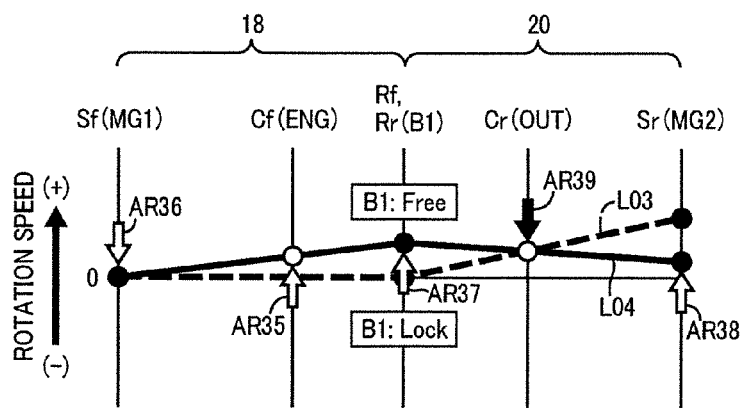
FIG. 14 is a collinear diagram for explaining the case of starting the engine during the EV running in the hybrid vehicle of FIG. 1 to make a shift from the EV running to the parallel HV running.
Figure 15:
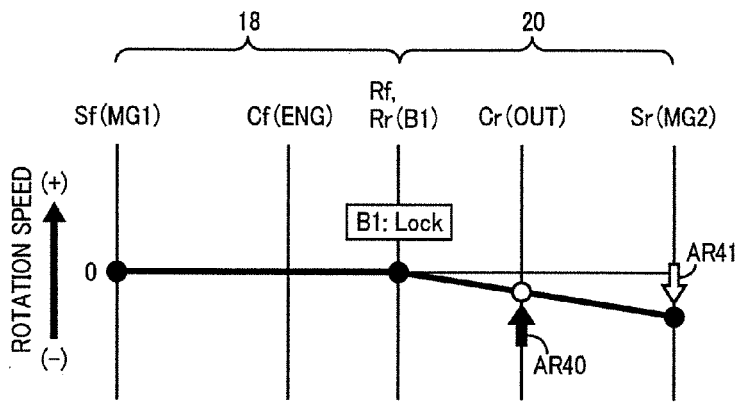
FIG. 15 is a collinear diagram when the EV running is performed in backward running in the hybrid vehicle of FIG. 1.
Figure 16:
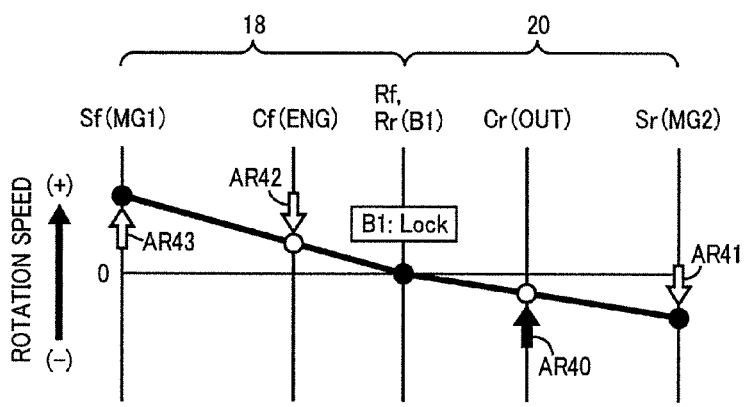
FIG. 16 is a collinear diagram when the engine is started in the EV running when the hybrid vehicle of FIG. 1 is running backward.
Figure 17:
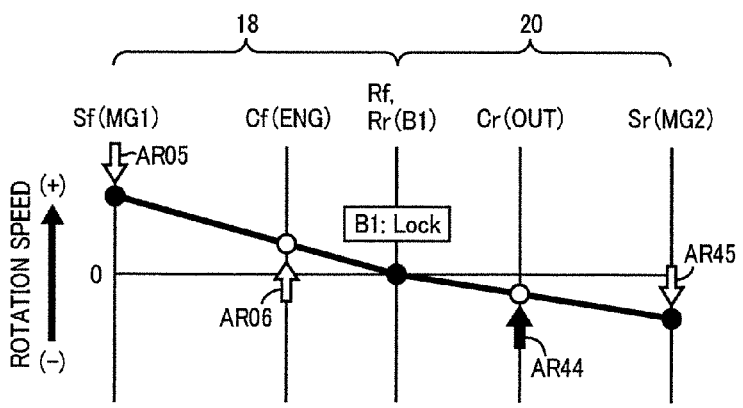
FIG. 17 is a collinear diagram when the series HV running is performed in the hybrid vehicle of FIG. 1.

| vehicle state | engine | status | collinear diagram number |
|---|---|---|---|
| stopping | OFF | stop | FIG. 3 |
|  | ON | engine start during stop | FIG. 4 |
|  |  | electricity generation during stop | FIG. 5 |
| moving forward | ON | series HV running (forward) | FIG. 6 |
|  |  | parallel HV running (low speed) | FIG. 7 |
|  |  | parallel HV running (high speed) | FIG. 8 |
|  |  | parallel HV running (start) | FIG. 9 |
|  |  | parallel HV running (regeneration) | FIG. 10 |
|  |  | accelerator-off → engine stop | FIG. 11 |
|  | OFF | EV running (forward) | FIG. 12 |
|  |  | EV running (regeneration) | FIG. 13 |
|  |  | EV running → engine start | FIG. 14 |
| moving backward | OFF | EV running (backward) | FIG. 15 |
|  |  | engine start during EV running (backward) | FIG. 16 |
|  | ON | series HV running (backward) | FIG. 17 |

FIG. 3 is a collinear diagram when the engine 12 is in the non-drive state during stop. In the collinear diagram of FIG. 3, the engine 12 is in the non-drive state and rotation speed of the first carrier Cf is zero. Because the vehicle is stopped, the output rotation speed Nout is zero, i.e., rotation speed of the second carrier Cr is zero. Therefore, rotation speeds of the rotating elements of the first planetary gear device 18 and the second planetary gear device 20 are zero. In the state of FIG. 3, the brake B1 may be in either the engaged state or the released state and is preferably the engaged state. This is because the brake B1 must be engaged if the EV running is started or the engine 12 is started.

FIG. 4 is a collinear diagram when the engine is started during stop. In the collinear diagram of FIG. 4, if the engine is started during stop, the electronic control device 50 first puts the brake B1 into the engaged state (also referred to as a lock state) to make the first ring gear Rf and the second ring gear Rr non-rotatable. While the first ring gear Rf and the second ring gear Rr are kept non-rotatable by the brake B1, the engine 12 is rotated by the first electric motor MG1. In particular, a torque Tg of the first electric motor MG1 (hereinafter referred to as a first electric motor torque Tg) is output as indicated by an arrow AR01 of FIG. 4, thereby raising the engine rotation speed Ne. In short, cranking of the engine 12 is performed by the first electric motor MG1. When the engine rotation speed Ne becomes equal to or greater than a predetermined rotation speed of starting ignition of the engine, the electronic control device 50 starts supplying fuel to the engine 12 and starts ignition of the engine. An arrow AR02 of FIG. 4 represents rotation resistance (e.g., in Nm) of the engine 12 at the time of cranking of the engine 12.

FIG. 5 is a collinear diagram when electricity is generated from the power of the engine during stop. In the collinear diagram of FIG. 5, if electricity is generated during stop, the electronic control device 50 first puts the brake B1 into the engaged state to make the first ring gear Rf and the second ring gear Rr non-rotatable. While the first ring gear Rf and the second ring gear Rr are kept non-rotatable by the brake B1, the first electric motor MG1 is rotated by engine torque Te. Since the first electric motor MG1 is rotated in this way, the first electric motor MG1 generates electricity. An arrow AR03 of FIG. 5 represents a regenerative torque (electric generation torque) generated by the electric generation of the first electric motor MG1, and an arrow AR04 represents the engine torque Te against the regenerative torque.

FIG. 6 is a collinear diagram when the series HV running is performed. In FIG. 6, the vehicle 8 is running forward and a drive force in the forward direction is generated. In the collinear diagram of FIG. 6, if the series HV running is performed, as is the case with the collinear diagram of FIG. 5, while the first ring gear Rf and the second ring gear Rr are kept non-rotatable by putting the brake B1 into the engaged state on the first planetary gear device 18 side, the electronic control device 50 rotates the first electric motor MG1 with the engine torque Te, thereby generating electricity with the first electric motor MG1. An arrow AR05 of FIG. 6 represents a regenerative torque of the first electric motor MG1, and an arrow AR06 represents the engine torque Te against the regenerative torque. On the other hand, the electronic control device 50 causes a torque Tm of the second electric motor MG2 (hereinafter referred to as a second electric motor torque Tm) to be output for vehicle running on the second planetary gear device 20 side to drive the output gear 22 with the second electric motor MG2. Therefore, the drive wheels 30 coupled to the output gear 22 is driven by the second electric motor MG2. An arrow AR07 of FIG. 6 represents the second electric motor torque Tm and an arrow AR08 represents a running load (e.g., in Nm) transmitted from the drive wheels 30 to the second carrier Cr, i.e., a running load torque applied to the second carrier Cr (output gear 22). As described above, the electronic control device 50 makes the first ring gear Rf and the second ring gear Rr non-rotatable by the brake B1 to perform the series HV running. Although the collinear diagram of FIG. 6 represents forward movement of the vehicle, if the vehicle 8 is moved backward, the electronic control device 50 may rotate the second electric motor MG2 in the negative direction in FIG. 6. The running load is also referred to as running resistance.

FIG. 7 is a collinear diagram when the parallel HV running is performed in forward running at low vehicle speed. In the collinear diagram of FIG. 7, if the parallel HV running is performed, the electronic control device 50 puts the brake B1 into the released state (also referred to as a free state) so as to transmit the power of the engine 12 to the drive wheels 30. In other words, the parallel HV running is performed by releasing the brake B1. The electronic control device 50 causes the engine torque Te indicated by an arrow AR09 to be output and causes the first electric motor MG1 to output a reaction torque (the first electric motor torque Tg) against the engine torque Te as indicated by an arrow AR10. As a result, the engine torque Te is transmitted to the first ring gear Rf and the second ring gear Rr. An arrow AR11 of FIG. 7 represents the engine torque Te transmitted to the first ring gear Rf and the second ring gear Rr, i.e., an engine direct torque at the first ring gear Rf and the second ring gear Rr. Although the electronic control device 50 rotates the first electric motor MG1 in the positive direction if the power of the engine 12 is transmitted to the drive wheels 30, the electronic control device 50 preferably controls the first electric motor MG1 such that the first electric motor rotation speed Ng becomes zero or substantially zero in the positive rotation direction as depicted in FIG. 7 so as to acquire favorable power transmission efficiency. In FIG. 7, the electronic control device 50 causes the second electric motor torque Tm indicated by an arrow AR 12 to be output in the direction driving the output gear 22. The output gear 22 is driven by the engine direct torque (arrow AR11) and the second electric motor torque Tm (arrow AR12). In other words, the drive wheels 30 are driven. An arrow AR13 of FIG. 7 represents the running load transmitted from the drive wheels 30, and the engine direct torque (arrow AR11) and the second electric motor torque Tm (arrow AR12) are against the running load (arrow AR13). An operating point of the first planetary gear device 18 at the first electric motor rotation speed Ng of zero in the drive state of the engine 12 as in FIG. 7 is referred to as a mechanical point.

FIG. 8 is a collinear diagram when the parallel HV running is performed in forward running at high vehicle speed. In FIG. 8, as compared to FIG. 7, the vehicle speed V is higher and, therefore, the rotation speed of the second carrier Cr is higher. Thus, the second electric motor rotation speed Nm is also higher. Although the engine rotation speed Ne and the first electric motor rotation speed Ng of FIG. 8 may be different from FIG. 7, the speeds are the same as FIG. 7. As can be seen from comparison between FIGS. 7 and 8, the electronic control device 50 can adjust the second electric motor rotation speed Nm to arbitrarily control the engine rotation speed Ne and the first electric motor rotation speed Ng regardless of a level of the vehicle speed V. In the collinear diagram of FIG. 8, as is the case with the collinear diagram of FIG. 7, the brake B1 is put into the released state; an arrow AR14 represents the engine torque Te; an arrow AR15 represents the reaction torque of the first electric motor MG1; an arrow AR16 represents the engine direct torque at the first ring gear Rf and the second ring gear Rr; an arrow AR17 represents the second electric motor torque Tm; and an arrow AR18 represents the running load.

FIG. 9 is a collinear diagram when the vehicle is started in the parallel HV running. Since the collinear diagram of FIG. 9 depicts a vehicle state during the parallel HV running, the brake B1 is in the released state. In FIG. 9, as is the case with FIG. 7, an arrow AR19 represents the engine torque Te; an arrow AR20 represents the reaction torque of the first electric motor MG1; an arrow AR21 represents the engine direct torque at the first ring gear Rf and the second ring gear Rr; an arrow AR22 represents the second electric motor torque Tm; and an arrow AR23 represents the running load. However, since FIG. 9 is a collinear diagram at the vehicle start, the vehicle speed V is zero and, therefore, the rotation speed of the second carrier Cr is zero. Thus, when the vehicle speed V is zero at the vehicle start, the second electric motor MG2 rotates in the negative direction. The electronic control device 50 increases, for example, the engine direct torque (arrow AR21) and the second electric motor torque Tm (arrow AR22) at the vehicle start to raise the vehicle speed V while raising the second electric motor rotation speed Nm in the positive direction.

FIG. 10 is a collinear diagram when a reverse drive force from the drive wheels 30 is regenerated in the parallel HV running. Since the collinear diagram of FIG. 10 depicts a vehicle state during the parallel HV running, the brake B1 is in the released state. For example, when coasting is performed because of release of an accelerator pedal etc. during vehicle running, the reverse drive force may be regenerated. In the regeneration of the reverse drive force, the electronic control device 50 puts the engine 12 basically into the non-drive state and causes only the second electric motor MG2 to perform regenerative operation or causes the first electric motor MG1 and the second electric motor MG2 to perform regenerative operation. Since the engine 12 is put into the non-drive state and dragged and rotated by the reverse drive force on the first planetary gear device 18 side in the collinear diagram of FIG. 10, the engine 12 generates rotation resistance as indicated by an arrow AR24. The electronic control device 50 causes the first electric motor MG1 to output a reaction torque against the rotation resistance of the engine 12 as indicated by an arrow AR25. As a result, the rotation resistance of the engine 12 is transmitted to the first ring gear Rf and the second ring gear Rr, and a torque is generated in the negative direction as indicated by an arrow AR26. On the other hand, on the second planetary gear device 20 side, the electronic control device 50 causes the second electric motor MG2 rotating in the positive direction to generate a regenerative torque (arrow AR27) braking the second electric motor MG2. On the second planetary gear device 20 side of FIG. 10, the torque (arrow AR26) in the negative direction of the first ring gear Rf and the second ring gear Rr and the regenerative torque (arrow AR27) of the second electric motor MG2 are against reverse drive torque (arrow AR28) of the reverse drive force from the drive wheels 30 rotating the second carrier Cr. For example, in FIG. 10, the electronic control device 50 adjusts the first electric motor torque Tg (arrow AR25) as the reaction torque and the second electric motor torque Tm (arrow AR27) as the regenerative torque such that electric generation efficiency of the first electric motor MG1 and the second electric motor MG2 becomes higher as a whole. Since the first electric motor rotation speed Ng is zero or substantially zero in FIG. 10, generated electric power of the first electric motor MG1 is zero or substantially zero and only the second electric motor MG2 generates electricity. During regeneration in the parallel HV running, the first electric motor rotation speed Ng may not be zero or substantially zero.

FIG. 11 is a collinear diagram for explaining the case of stopping the engine 12 during the parallel HV running to make a shift from the parallel HV running to the EV running. For example, if the accelerator pedal is released or a depressing amount of the accelerator pedal is reduced during the parallel HV running, the parallel HV running may be shifted to the EV running. In FIG. 11, a broken line L01 represents rotation speeds of the rotating elements during the parallel HV running and a solid line L02 represents rotation speeds of the rotating elements during the EV running. During the parallel HV running indicated by the broken line L01, the brake B1 is in the released state. When switching the vehicle 8 from the parallel HV running to the EV running, the electronic control device 50 engages the brake B1 and then stops the engine 12 while retaining the rotation speed of the second carrier Cr corresponding to the vehicle speed V. In this way, the electronic control device 50 performs the EV running after stop of the engine 12.

Therefore, during the EV running indicated by the solid line L02, the brake B1 is in the engaged state. In FIG. 11, an arrow AR29 represents the second electric motor torque Tm and an arrow AR30 represents the running load transmitted from the drive wheels 30. The switching from the parallel HV running to the EV running will be described in detail later with reference to FIG. 18.

FIG. 12 is a collinear diagram when the EV running is performed. In FIG. 12, the vehicle 8 is running forward and the drive force in the forward direction is generated. In the collinear diagram of FIG. 12, if the EV running is performed, the electronic control device 50 puts the brake B1 into the engaged state to make the first ring gear Rf and the second ring gear Rr non-rotatable. The electronic control device 50 causes the second electric motor torque Tm to be output and drives the output gear 22 with the second electric motor MG2 for vehicle running. In other words, the drive wheels 30 coupled to the output gear 22 is driven by the second electric motor MG2. An arrow AR31 of FIG. 12 represents the second electric motor torque Tm and an arrow AR32 represents the running load transmitted from the drive wheels 30. As described above, the electronic control device 50 makes the first ring gear Rf and the second ring gear Rr non-rotatable by the brake B1 to perform the EV running. Since the brake B1 is engaged during the EV running, both the engine rotation speed Ne and the first electric motor rotation speed Ng are zero as depicted in FIG. 12 except the time of engine start. Therefore, during the EV running, the engine 12 is not dragged and rotated by the drive wheels 30 and the first electric motor MG1 is not caused to idle. Although the collinear diagram of FIG. 12 represents forward movement of the vehicle, if the vehicle 8 is moved backward, the electronic control device 50 may rotate the second electric motor MG2 in the negative direction in FIG. 12.

FIG. 13 is a collinear diagram when the EV running is performed. However, although the vehicle 8 is running forward in FIG. 13, the second electric motor MG2 is regeneratively operated by the reverse drive force from the drive wheels 30 unlike the collinear diagram of FIG. 12. In particular, in FIG. 13, the electronic control device 50 generates the regenerative torque (arrow AR34) of the second electric motor MG2 against the reverse drive torque (arrow AR33) of the reverse drive force from the drive wheels 30 rotating the second carrier Cr, thereby regenerating the reverse drive force with the second electric motor MG2 in this way.

FIG. 14 is a collinear diagram for explaining the case of starting the engine 12 during the EV running to make a shift from the EV running to the parallel HV running. For example, in the case of additional depression of the accelerator pedal etc. during EV running, the EV running may be shifted to the parallel HV running. In FIG. 14, a broken line L03 represents rotation speeds of the rotating elements during the EV running and a solid line L04 represents rotation speeds of the rotating elements during the parallel HV running. During the EV running indicated by the broken line L03, the brake B1 is in the engaged state. When switching the vehicle 8 from the EV running to the parallel HV running, the electronic control device 50 first cranks the engine 12 with the first electric motor MG1 as is the case with the engine start described with reference to FIG. 4 and starts the engine 12. The electronic control device 50 releases the brake B1 after start of the engine 12, thereby starting the parallel HV running. The rotation speeds of the rotating elements indicated by the solid line L04 and the torques related thereto are the same as the collinear diagram of FIG. 7, for example. Therefore, during the parallel HV running indicted by the solid line L04, the brake B1 is put into the released state. An arrow AR35 represents the engine torque Te; an arrow AR36 represents the reaction torque of the first electric motor MG1 against the engine torque Te; an arrow AR37 represents the engine direct torque at the first ring gear Rf and the second ring gear Rr; an arrow AR38 represents the second electric motor torque Tm; and an arrow AR39 represents the running load transmitted from the drive wheels 30. The switching from the EV running to the parallel HV running will be described in detail later with reference to FIG. 19.

FIG. 15 is a collinear diagram when the EV running is performed. However, unlike the collinear diagram of FIG. 12, the vehicle 8 is running backward in FIG. 15 and drive force in the backward direction is generated. Therefore, in FIG. 15, the second carrier Cr rotates in the negative direction and the running load is generated in the direction of braking the second carrier Cr as indicated by an arrow AR40. Since the brake B1 is in the engaged state, the second sun gear Sr integrally rotating with the second electric motor MG2 also rotates in the negative direction, and the electronic control device 50 causes the second electric motor torque Tm to be output as indicated by an arrow AR41 in the negative direction against the running load (arrow AR40).

FIG. 16 is a collinear diagram when the engine 12 is started in the EV running when the vehicle 6 same as FIG. 15 is moved backward. In FIG. 16, rotation states of the rotating elements on the second planetary gear device 20 side and an engaged state of the brake B1 are the same as FIG. 15. In FIG. 16, on the first planetary gear device 18 side, the electronic control device 50 cranks the engine 12 with the first electric motor MG1 as is the case with the engine start described with reference to FIG. 4 and starts the engine 12. An arrow AR42 of FIG. 16 represents the rotation resistance of the engine 12 generated at the time of cranking of the engine 12 and an arrow AR43 represents the first electric motor torque Tg generated by the electronic control device 50 against the rotation resistance of the engine 12.

FIG. 17 is a collinear diagram when the series HV running is performed. Although the series HV running is performed as is the case with FIG. 6, FIG. 17 is different from FIG. 6 in that vehicle 8 is running backward and is caused to generate a drive force in the backward direction. Therefore, in FIG. 17, rotation states of the rotating elements on the first planetary gear device 18 side and an engaged state of the brake B1 are the same as FIG. 6. On the other hand, the second carrier Cr rotates in the negative direction on the second planetary gear device 20 side in FIG. 17, and the running load is generated in the direction of braking the second carrier Cr as indicated by an arrow AR44. Since the brake B1 is in the engaged state, the second sun gear Sr also rotates in the negative direction, and the electronic control device 50 causes the second electric motor torque Tm to be output as indicated by an arrow AR45 in the negative direction against the running load (arrow AR44).

FIG. 18 is a diagram for explaining control of switching the running mode of the vehicle 8 from the parallel HV running to the EV running during the parallel HV running in forward running at low vehicle speed and FIGS. 18(a) to 18(d) are collinear diagrams of the first planetary gear device 18 and the second planetary gear device 20 arranged in time series. Since FIG. 18(a) represents the parallel HV running in forward running at low vehicle speed, rotation states of the rotating elements depicted in FIG. 18(a) are the same as the collinear diagram of FIG. 7 described above. Therefore, in the collinear diagram of FIG. 18(a), an arrow AR51 represents the engine torque Te; an arrow AR52 represents the reaction torque of the first electric motor MG1 (first electric motor rotation speed Ng) against the engine torque Te; an arrow AR53 represents the engine direct torque at the first ring gear Rf and the second ring gear Rr; an arrow AR54 represents the second electric motor torque Tm; and an arrow AR55 represents the running load transmitted from the drive wheels 30. The electronic control device 50 releases the brake B1, and the second electric motor MG2 rotates in the positive direction while the first electric motor MG1 is controlled by the electronic control device 50 such that the first electric motor rotation speed Ng becomes zero or substantially zero in the positive rotation direction.

To switch the parallel HV running to the EV running, the electronic control device 50 must stop the engine 12 after engaging the brake B1 while suppressing an influence on rotation of the drive wheels 30. Therefore, to reduce a shock at the time of engagement of the brake B1, the electronic control device 50 controls the first electric motor MG1 and the second electric motor MG2 such that rotation speed of the first ring gear Rf and the second ring gear Rr comes closer to zero, i.e., the rotation of the gears Rf, Rr is stopped, while retaining the vehicle speed V and the running load (arrow AR55). In other words, the electronic control device 50 controls the first electric motor MG1 and the second electric motor MG2 to raise the first electric motor rotation speed Ng and the second electric motor rotation speed Nm while retaining the vehicle speed V and the running load (arrow AR55), thereby bringing the rotation speed of the first ring gear Rf and the second ring gear Rr closer to zero. With such control, specifically, the rotating elements of the first planetary gear device 18 and the second planetary gear device 20 are changed from a broken line L05 indicative of the rotation state same as FIG. 18(a) to the rotation state indicated by a solid line L06 as depicted in the collinear diagram of FIG. 18(b). For example, the rotation speed of the first ring gear Rf and the second ring gear Rr of the solid line L06 has reached zero or substantially zero.

After controlling the first electric motor MG1 and the second electric motor MG2 such that the rotation speed of the first ring gear Rf and the second ring gear Rr comes closer to zero while retaining the vehicle speed V and the running load (arrow AR55), the electronic control device 50 actuates the brake B1 to make the first ring gear Rf and the second ring gear Rr non-rotatable. Specifically, if the rotation speed of the first ring gear Rf and the second ring gear Rr falls within an allowable rotation speed range empirically set in advance such that the shock at the time of engagement of the brake B1 is substantially reduced and that zero rotation is included, the electronic control device 50 engages the brake B1. FIG. 18(c) depicts the collinear diagram after the engagement of the brake B1. As can be seen from that the collinear diagram is equivalent to the collinear diagram of FIG. 6 described above, FIG. 18(c) is the collinear diagram during the series HV running in forward running.

The electronic control device 50 stops the engine 12 after completion of the engagement actuation of the brake B1. The stop of the engine 12 completes the switching from the parallel HV running to the EV running and the EV running is started. As described above, if the parallel HV running is switched to the EV running, the electronic control device 50 stops the engine 12 after temporarily going through the series HV running. FIG. 18(d) depicts the collinear diagram after the stop of the engine 12 and, as can be seen from that the collinear diagram is equivalent to the collinear diagram of FIG. 12 described above, FIG. 18(d) is the collinear diagram during the EV running in forward running.

Figure 19A:
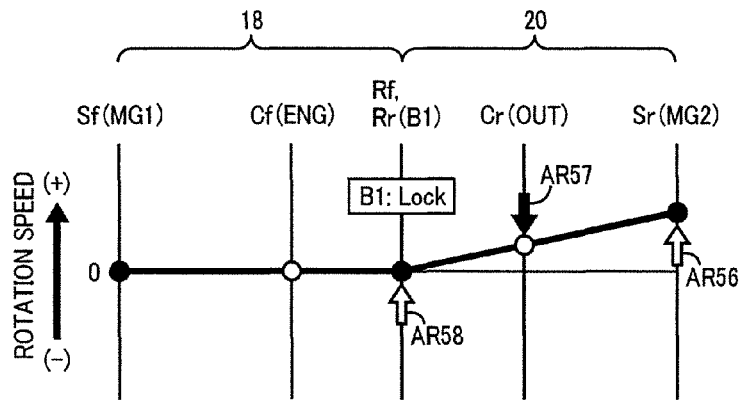
FIG. 19 is a diagram for explaining control of starting the engine during the EV running in forward running to switch a running mode of the vehicle from the EV running to the parallel HV running in the hybrid vehicle of FIG. 1 and (a) to (d) in FIG. 19 are collinear diagrams of the first planetary gear device and the second planetary gear device arranged in time series.

FIG. 19 is a diagram for explaining control of starting the engine 12 during the EV running in forward running to switch the running mode of the vehicle 8 from the EV running to the parallel HV running and FIGS. 19(a) to 19(d) are collinear diagrams of the first planetary gear device 18 and the second planetary gear device 20 arranged in time series. Since FIG. 19(a) represents the EV running in forward running, as is the case with the collinear diagram of FIG. 12 described above, an arrow AR56 of FIG. 19(a) represents the second electric motor torque Tm and an arrow AR57 represents the running load transmitted from the drive wheels 30. In FIG. 19(a), an arrow AR58 represents a brake reaction torque generated by the brake B1 against the running load (running resistance). In other words, with regard to the brake reaction torque represented by the arrow AR58, since the reaction torque against the running load is shared by the brake B1 and the second electric motor MG2 in the EV running, the brake reaction torque (arrow AR58) corresponds to a share of the reaction torque against the running load allocated to the brake B1.

In FIG. 19, since the engine 12 is started during the EV running depicted in FIG. 19(a), the electronic control device 50 cranks the engine 12 with the first electric motor MG1 as is the case with the engine start described with reference to FIG. 4 and starts the engine 12 in this case. Specifically, while the brake B1 is kept in the engaged state, i.e., while the first ring gear Rf and the second ring gear Rr are kept non-rotatable by the brake B1, the electronic control device 50 causes the first electric motor MG1 to rotate the engine 12. In short, the cranking of the engine 12 is performed. When the engine rotation speed Ne becomes equal to or greater than a predetermined rotation speed of starting ignition of the engine, the fuel supply to the engine 12 is started and the ignition of the engine is started.

Figure 19B:
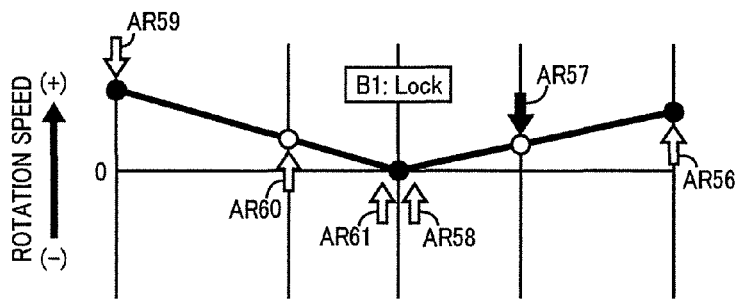

When the engine 12 is started, the vehicle 8 is switched to the series HV running. The collinear diagram in the series HV running is depicted in FIG. 19(b). Since FIG. 19(b) represents the series HV running in forward running, as is the case with the collinear diagram of FIG. 6 described above, an arrow AR59 of FIG. 19(b) represents the regenerative torque of the first electric motor MG1 (first electric motor torque Tg), and an arrow AR60 represents the engine torque Te against the regenerative torque. In FIG. 19(b), an arrow AR61 represents the engine direct torque at the first ring gear Rf and the second ring gear Rr, i.e., a torque applied to the brake B1 due to the power of the engine 12.

Figure 19C:
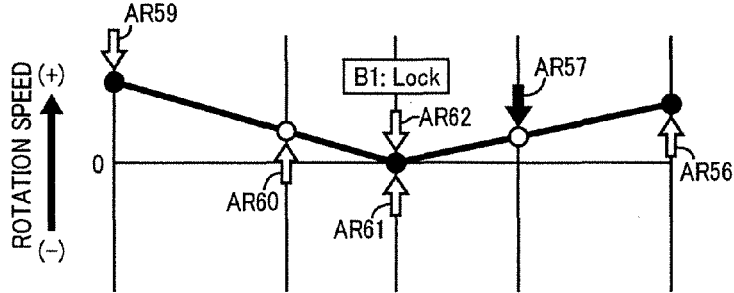

After switching the running mode of the vehicle 8 to the series HV running as depicted in FIG. 19(b), the electronic control device 50 then provides brake zero torque control of adjusting the first electric motor torque Tg and the engine torque Te such that the torque applied to the brake B1 due to the power of the engine 12, i.e., the engine direct torque (arrow AR61), reaches a magnitude balancing with a torque applied to the brake B1 due to the running load (arrow AR57), i.e., a torque represented by an arrow AR62 of FIG. 19(c). In other words, the brake zero torque control is to control the first electric motor MG1 and the engine 12 such that that the torque applied to the brake B1 is brought closer to zero in the first planetary gear device 18 and the second planetary gear device 20 during the series HV running, i.e., such that the brake B1 in the engaged state brings the generated torque closer to zero. In this case, for example, the electronic control device 50 calculates the engine direct torque (arrow AR61) based on the first electric motor torque Tg and a gear ratio of the first planetary gear device 18 and calculates the torque (arrow AR62) applied to the brake B1 due to the running load based on the second electric motor torque Tm and a gear ratio of the second planetary gear device 20. FIG. 19(c) depicts the rotation states of the rotating elements of the first planetary gear device 18 and the second planetary gear device 20 in the provision of the brake zero torque control. The torque (arrow AR62) applied to the brake B1 due to the running load is torque having the same magnitude as, and the direction opposite to, the brake reaction torque (arrow AR58). Since the brake zero torque control is transiently-provided control and an inertia of the engine 12 is large, the electronic control device 50 may provide the brake zero torque control by adjusting the first electric motor torque Tg without adjusting the engine torque Te.

Figure 19D:
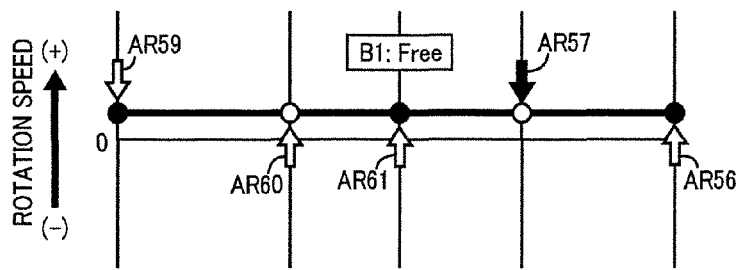

If the engine direct torque (arrow AR61) reaches the magnitude balancing with the torque (arrow AR62) applied to the brake B1 due to the running load as a result of the provision of the brake zero torque control, the electronic control device 50 completes (terminates) the brake zero torque control and releases the brake B1. For example, when the engine direct torque (arrow AR61) reaches the magnitude balancing with the torque (arrow AR62) applied to the brake B1 due to the running load, this means that a brake torque difference (absolute value), i.e., a difference between the engine direct torque and the torque applied to the brake B1 due to the running load, becomes equal to or less than an allowable torque difference empirically defined in advance such that a shock at the time of release of the brake B1 is sufficiently reduced. FIG. 19(d) depicts the rotation states of the rotating elements of the first planetary gear device 18 and the second planetary gear device 20 during the parallel HV running after release of the brake B1. As depicted in FIG. 19(d), the release of the brake B1 completes the switching from the EV running to the parallel HV running and the parallel HV running is started after the release of the brake B1. In FIG. 19(d), the electronic control device 50 causes the first electric motor MG1 to generate electricity and causes the second electric motor MG2 to perform power running. As can be seen from FIGS. 19 (a) to 19(d), if the EV running is switched to the parallel HV running, the electronic control device 50 releases the brake B1 to start the parallel HV running after temporarily going through the series HV running.

Figure 20A:
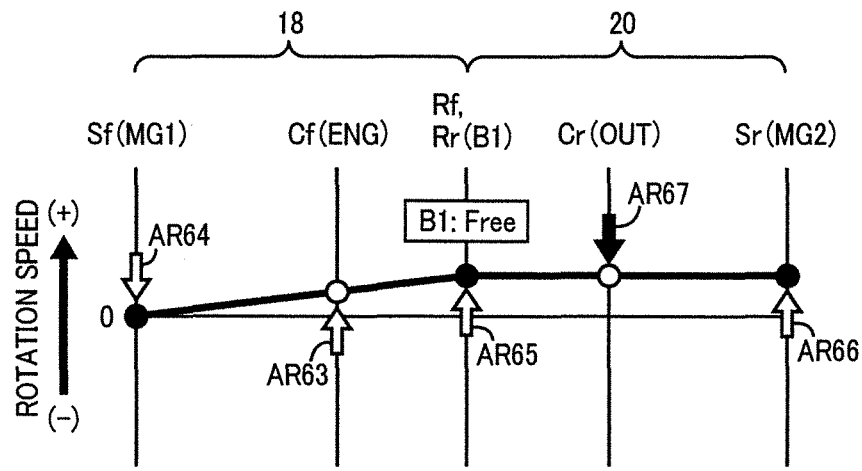
FIG. 20 is a diagram for explaining control of regenerating the reverse drive force from the drive wheels during the parallel HV running in forward running in the hybrid vehicle of FIG. 1 and (a) to (c) in FIG. 20 are collinear diagrams of the first planetary gear device and the second planetary gear device.
Figure 20B:
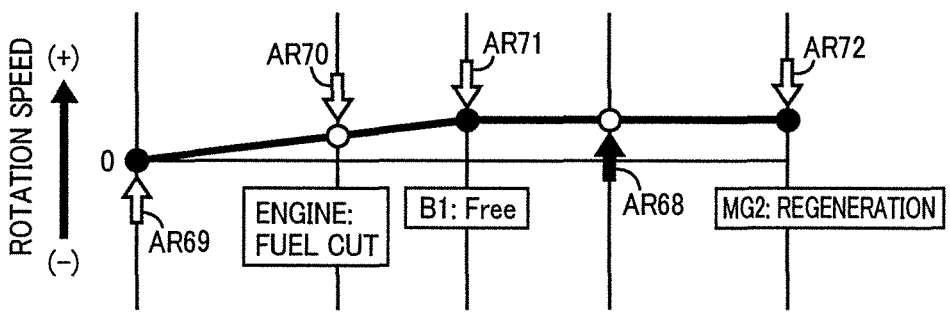
Figure 20C:
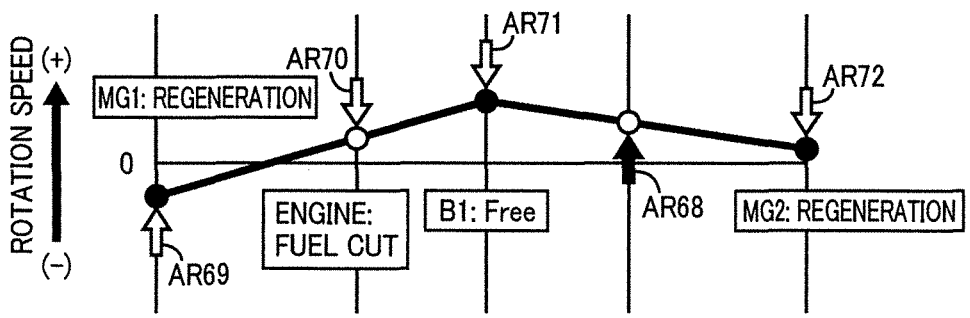

FIG. 20 is a diagram for explaining control of regenerating the reverse drive force from the drive wheels 30 during the parallel HV running in forward running and FIGS. 20(a) to 20(c) are collinear diagrams of the first planetary gear device 18 and the second planetary gear device 20. In each of FIGS. 20 (a) to 20(c), the brake B1 is released.

Specifically, FIG. 20(a) is a collinear diagram when the drive wheels 30 are driven by the engine 12 and the second electric motor MG2 during the parallel HV running in forward running. Therefore, as is the case with the collinear diagram of FIG. 7 described above, in the collinear diagram of FIG. 20(a), an arrow AR63 represents the engine torque Te; an arrow AR64 represents the reaction torque of the first electric motor MG1 (first electric motor torque Tg) against the engine torque Te; an arrow AR65 represents the engine direct torque at the first ring gear Rf and the second ring gear Rr; an arrow AR66 represents the second electric motor torque Tm; and an arrow AR67 represents the running load transmitted from the drive wheels 30.

FIG. 20(b) is a collinear diagram when the reverse drive force is regenerated because of release of the accelerator pedal etc. during the parallel HV running depicted in FIG. 20(a) and is a collinear diagram for explaining a first regenerative control pattern in the regeneration of the reverse drive force. In particular, in FIG. 20(b), the running load (arrow AR67) of FIG. 20(a) is switched to the reverse drive torque (arrow AR68) of the reverse drive force rotating the second carrier Cr. As depicted in FIG. 20(b), in the first regenerative control pattern, the electronic control device 50 puts the engine 12 into the non-drive state through interruption of fuel supply (fuel cut). At the same time, the electronic control device 50 controls the first electric motor torque Tg (arrow AR69) such that the first electric motor MG1 is prevented from rotating in the positive direction and such that the first electric motor rotation speed Ng is converged to zero, or in other words, brought closer to zero. Therefore, on the first planetary gear device 18 side of FIG. 20(b), the engine 12 is kept in the non-drive state and dragged and rotated by the reverse drive force and, therefore, the engine 12 generates rotation resistance as indicated by an arrow AR70. Thus, the first electric motor torque Tg indicated by the arrow AR69 is a reaction torque against the rotation resistance (arrow AR70) of the engine 12. Since the first electric motor torque Tg (arrow AR69) is generated and the engine 12 is dragged and rotated in this way, the rotation resistance of the engine 12 is transmitted to the first ring gear Rf and the second ring gear Rr to generate a torque in the negative direction as indicted by an arrow AR71. On the other hand, on the second planetary gear device 20 side of FIG. 20(b), the electronic control device 50 causes the second electric motor MG2 rotating in the positive direction to generate regenerative torque (arrow AR72) braking the second electric motor MG2. On the second planetary gear device 20 side, the torque in the negative direction at the first ring gear Rf and the second ring gear Rr (arrow AR71) and the regenerative torque of the second electric motor MG2 (arrow AR72) are against the reverse drive torque (arrow AR68) of the reverse drive force from the drive wheels 30 rotating the second carrier Cr. In the first regenerative control pattern with the first electric motor MG1, the second electric motor MG2, and the engine 12 controlled as described above, since the first electric motor MG1 is controlled to converge the first electric motor rotation speed Ng to zero as can be seen from FIG. 20(b), the generated electric power of the first electric motor MG1 is zero or substantially zero and only the second electric motor MG2 generates electricity. Therefore, in the first regenerative control pattern, the electronic control device 50 performs the regeneration with the second electric motor MG2.

FIG. 20(c) is a collinear diagram when the reverse drive force is regenerated because of release of the accelerator pedal etc. during the parallel HV running depicted in FIG. 20(a) and is a collinear diagram for explaining a second regenerative control pattern in the regeneration of the reverse drive force. Therefore, the torques (arrows AR68 to AR72) depicted in FIG. 20(c) are the same as those of FIG. 20(b). However, in the second regenerative control pattern, as depicted in FIG. 20(c), the electronic control device 50 controls the first electric motor torque Tg (arrow AR69) so as to rotate the first electric motor MG1 at a predetermined regeneration-time first-electric-motor target rotation speed that is a rotation speed in the negative direction rather than converging the first electric motor rotation speed Ng to zero. The predetermined regeneration-time first-electric-motor target rotation speed is empirically set in advance such that the first electric motor MG1 regeneratively operates at an operating point resulting in acquisition of favorable regeneration efficiency of the first electric motor MG1. In the second regenerative control pattern with the first electric motor MG1, the second electric motor MG2, and the engine 12 controlled as described above, since the first electric motor MG1 rotates at a rotation speed in the negative direction for a regenerative operation as can be seen from FIG. 20(c), the first electric motor MG1 and the second electric motor MG2 generate electricity. Therefore, in the second regenerative control pattern, the electronic control device 50 performs the regeneration with the first electric motor MG1 and the second electric motor MG2. For example, a predetermined regeneration efficiency map is set by preliminarily empirically obtaining either the first regenerative control pattern or the second regenerative control pattern resulting in higher regenerative efficiency of the first electric motor MG1 and the second electric motor MG2 as a whole by using the vehicle speed V etc. as parameters and, when the reverse drive force is regenerated during the parallel HV running, the electronic control device 50 selects either the first regenerative control pattern or the second regenerative control pattern from the predetermined regeneration efficiency map.

According to this example, as depicted in FIG. 1, the vehicle drive device 10 includes the first planetary gear device 18 including the first sun gear Sf, the first ring gear Rf, and the first carrier Cf, and the second planetary gear device 20 including the second sun gear Sr, the second ring gear Rr, and the second carrier Cr. The first sun gear Sf is coupled to the first electric motor MG1; the first ring gear Rf is coupled to the second ring gear Rr; the first carrier Cf is coupled to the engine 12; the second sun gear Sr is coupled to the second electric motor MG2; and the second carrier Cr is coupled to the drive wheels 30. Therefore, even when the engine rotation speed Ne and the first electric motor rotation speed Ng are constant, the electronic control device 50 can change the second electric motor rotation speed Nm to arbitrarily control the vehicle speed V. Therefore, since an operating point of the first electric motor MG1 can freely be controlled regardless of the vehicle speed V and the engine rotation speed Ne even during vehicle running at high vehicle speed and, for example, the first electric motor MG1 can be maintained in positive rotation regardless of the vehicle speed V and the engine rotation speed Ne, an occurrence of power circulation causing the first electric motor MG1 to act as a motor and the second electric motor MG2 to act as an electric generator can be reduced. As a result, favorable fuel efficiency of the vehicle 8 can be acquired. The reduction of the power circulation in the vehicle drive device 10 of this example as described above will specifically be described by comparing FIGS. 21(a) and 21(b).

Figures 21A, 21B:
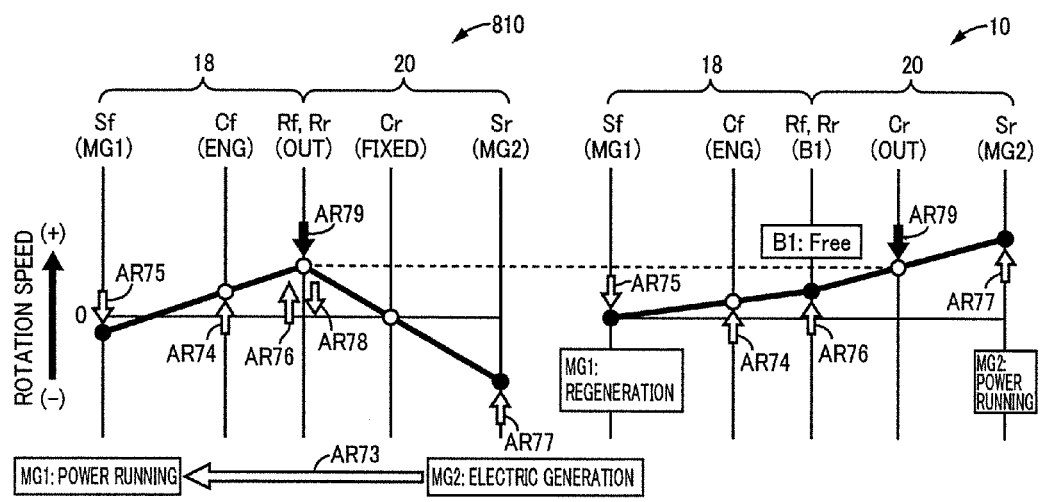
FIGS. 21(a) and 21(b) are collinear diagrams for explaining reduction of power circulation in the vehicle drive device of FIG. 1.

FIG. 21 is a collinear diagram for explaining the reduction of the power circulation in the vehicle drive device 10 through comparison between (a) and (b) in the figure. Both FIGS. 21(a) and 21(b) are collinear diagrams of the first planetary gear device 18 and the second planetary gear device 20, and FIGS. 21(a) and 21(b) depict the engine rotation speeds Ne equal to each other and the output rotation speeds Nout equal to each other. For example, the engine 12 is driven in both FIGS. 21(a) and 21(b) such that the operating point of the engine 12 is located on the fuel efficiency optimum line. However, FIG. 21(b) is a collinear diagram of the vehicle drive device 10, while FIG. 21(a) is a collinear diagram of a drive device 810 different from the vehicle drive device 10 of this example. The drive device 810 of FIG. 21(a) is basically the same as the vehicle drive device 10 and is different from the vehicle drive device 10 in that (i) the brake B1 is not included, that (ii) the second carrier Cr of the second planetary gear device 20 is always made non-rotatable, and that (iii) the output gear 22 is coupled to the first ring gear Rf and the second ring gear Rr instead of the second carrier Cr.

In the drive device 810 of FIG. 21(a), the engine 12 is controlled in accordance with the fuel efficiency optimum line and, therefore, the engine rotation speed Ne is not raised so much even when the vehicle V becomes higher. Therefore, for example, as depicted in FIG. 21(a), the first electric motor MG1 is caused to rotate in the negative direction during high vehicle speed in accordance with a rise in the rotation speed of the first ring gear Rf and the second ring gear Rr and, since the first electric motor MG1 performs power running while the second electric motor MG2 generates electricity, an electric path (arrow AR73) is formed that transmits electric energy from the second electric motor MG2 to the first electric motor MG1. Therefore, in FIG. 21(a), the power circulation occurs, causing a portion of the power of the engine 12 to consequently circulate through the electric path. Specifically, in FIG. 21(a), the first electric motor torque Tg (arrow AR75) is output as a reaction torque against the engine torque Te (arrow AR74) and, as a result, the engine torque Te is transmitted to the first ring gear Rf and the second ring gear Rr, and an arrow AR76 represents the engine direct torque at the first ring gear Rf and the second ring gear Rr to which the engine torque Te is transmitted. Since the first electric motor torque Tg (arrow AR75) is a torque in the negative direction and the first electric motor rotation speed Ng is also in the negative direction, the first electric motor MG1 acts as a motor and performs power running. Therefore, the second electric motor MG2 is caused to act as an electric generator and the second electric motor torque Tm (arrow AR77), i.e., the electric generation torque, is output in the direction of braking the rotation of the second electric motor MG2. The torque of the second electric motor torque Tm (arrow AR77) rotating the first ring gear Rf and the second ring gear Rr is represented as an arrow AR78. At the first ring gear Rf and the second ring gear Rr, the engine direct torque (arrow AR76) is against and balanced with the torque acquired by combining the torque represented by the arrow AR78 and the running load (arrow AR79). As can be seen from the above description, in FIG. 21(a), a portion of the engine output is used for the electric generation of the second electric motor MG2.

On the other hand, since the electronic control device 50 can change the second electric motor rotation speed Nm to arbitrarily control the rotation direction of the first electric motor MG1 although the engine rotation speed Ne and the vehicle speed V are the same as compared to FIG. 21(a) in the vehicle drive device 10 of this example depicted in FIG. 21(b), the electronic control device 50 causes the first electric motor MG1 to perform the regenerative operation while allowing zero rotation or positive rotation thereof, and causes the second electric motor MG2 to perform power running. Therefore, no power circulation occurs in FIG. 21(b). In FIG. 21(b), as is the case with FIG. 21(a), the arrow AR74 represents the engine torque Te; the arrow AR75 represents the first electric motor torque Tg; the arrow AR76 represents the engine direct torque; the arrow AR77 represents the second electric motor torque Tm; and the arrow AR79 represents the running load.

According to this example, the vehicle drive device 10 includes the brake B1 suppressing the rotation of the first ring gear Rf and the second ring gear Rr. Therefore, in the vehicle drive device 10, the electronic control device 50 can make the first ring gear Rf and the second ring gear Rr non-rotatable through the actuation (engagement) of the brake B1 and can provide respective independent controls on the engine side (first planetary gear device 18 side) and the second electric motor side (second planetary gear device 20 side) by making the first ring gear Rf and the second ring gear Rr non-rotatable in this way. For example, the series HV running can be performed.

Figure 22:
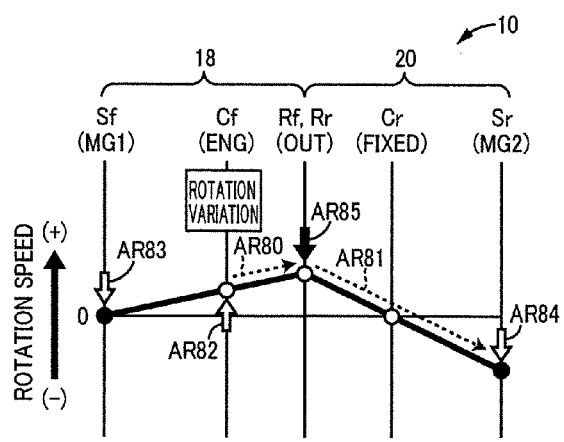
FIG. 22 is a collinear diagram of the drive device of FIG. 21 (a) and a diagram for explaining a situation of transmitting vibration of the engine to the drive wheels and the second electric motor by the drive device.
Figure 23:
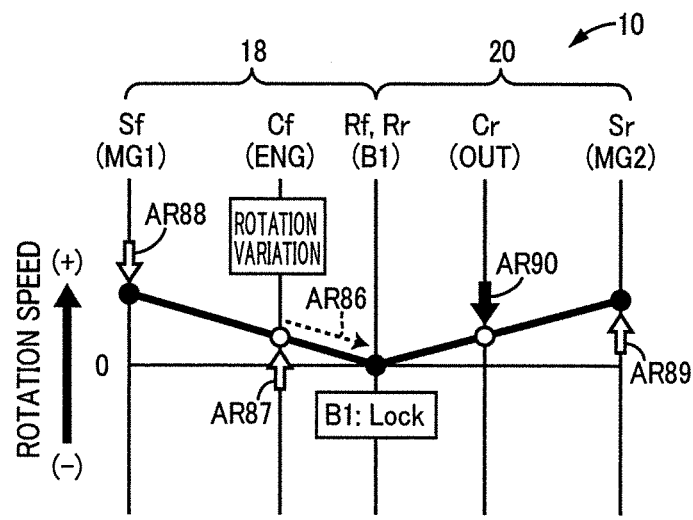
FIG. 23 is a collinear diagram of the vehicle drive device when the series HV running is performed in the hybrid vehicle of FIG. 1 and a diagram for explaining that the vibration of the engine is hardly transmitted to the drive wheels and the second electric motor in the vehicle drive device of FIG. 1.
Figure 24:
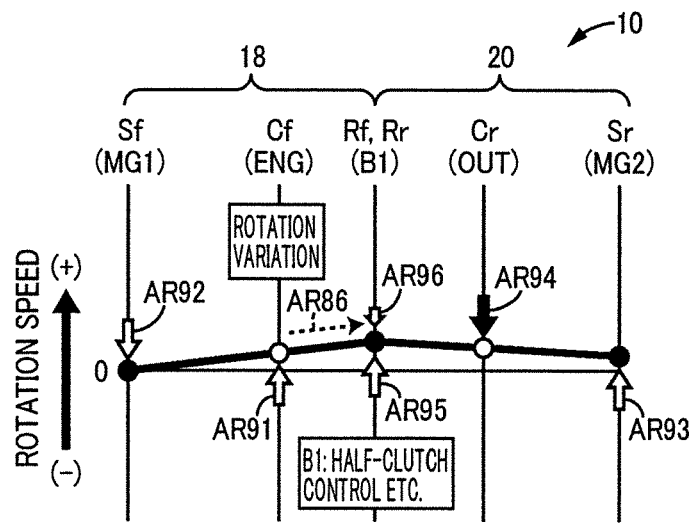
FIG. 24 is a collinear diagram of the vehicle drive device when the parallel HV running is performed in the hybrid vehicle of FIG. 1 and a diagram for explaining that the vibration of the engine is hardly transmitted to the drive wheels and the second electric motor in the vehicle drive device of FIG. 1.

When the brake B1 is put into the engagement state, vibration such as torque pulsation of the engine 12 is hardly transmitted to the drive wheels 30 or the second electric motor MG2 and, therefore, an occurrence of abnormal noise such as a tooth hitting noise due to the vibration from the engine 12 can be avoided or reduced. For example, since the drive device 810 of FIG. 21(a) described above does not include a brake corresponding to the brake B1 of this example, the vibration (such as rotation variation) of the engine 12 is transmitted to the drive wheels 30 and the second electric motor MG2 as indicated by broken line arrows AR80 and AR81 depicted in a collinear diagram of FIG. 22. On the other hand, when the series HV running is performed in the vehicle drive device 10 of this example, although the vibration of the engine 12 is transmitted to the first ring gear Rf and the second ring gear Rr as indicated by a broken line arrow AR86 in FIG. 23 that is a collinear diagram in this case, the transmission to the second planetary gear device 20 side is interrupted by the brake B1. Therefore, the vibration of the engine 12 is hardly transmitted to the drive wheels 30 and the second electric motor MG2 in the vehicle drive device 10. Although the electronic control device 50 basically releases the brake B1 when the parallel HV running is performed in the vehicle drive device 10 of this example, the transmission of the vibration of the engine 12 to the second planetary gear device 20 side can be interrupted or suppressed by providing half-clutch control of slipping the brake B1 with a slight engagement force during the parallel HV running as depicted in a collinear diagram of FIG. 24. Therefore, the vehicle drive device 10 can avoid or reduce the occurrence of abnormal noise such as the tooth hitting noise due to the vibration from the engine 12 not only during the series HV running but also in the parallel HV running FIG. 22 is a collinear diagram of the drive device 810 and FIGS. 23 and 24 are collinear diagrams of the vehicle drive device 10 of this example. In the collinear diagrams of FIGS. 22 to 24, arrows AR82, AR87, and AR91 represent the engine torque Te; arrows AR83, AR88, and AR92 represent the first electric motor torque Tg; arrows AR84, AR89, and AR93 represent the second electric motor torque Tm; and arrows AR85, AR90, and AR94 represent the running load. An arrow AR 95 of FIG. 24 represents the engine direct torque at the first ring gear Rf and the second ring gear Rr, and an arrow AR96 represents a braking toque generated by the brake B1 through the half-clutch control.

According to this example, the electronic control device 50 comprised in the vehicle drive device 10, makes the first ring gear Rf and the second ring gear Rr non-rotatable by the brake B1 to perform the electric motor running (EV running) for running with the power of the second electric motor MG2 while the engine 12 is put into the non-drive state. Therefore, for example, as compared to a hybrid vehicle etc., unable to stop the engine 12 during vehicle running, an improvement in fuel efficiency of the vehicle 8 can easily be achieved. Since not only the rotation of the engine 12 but also the rotation of the first electric motor MG1 is stopped during the EV running of the vehicle drive device 10 as depicted in FIG. 12, a dragging loss of the first electric motor MG1 is not generated and an improvement in fuel efficiency of the vehicle 8 can easily be achieved as compared to a hybrid vehicle with the first electric motor MG1 caused to idle during the EV running.

Although the drive device 810 of FIG. 21(a) can perform the EV running with the power of the second electric motor MG2 by causing the first electric motor MG1 to idle, rotation speed of the first pinion gear Pf of the first planetary gear device 18 becomes higher when the vehicle speed V becomes higher in the drive device 810. Therefore, although the drive device 810 is limited in the highest vehicle speed in the EV running because of allowable rotation speed of the first pinion gear Pf, the vehicle drive device 10 of this example has an advantage that the highest vehicle speed in the EV running is hardly limited as compared to the drive device 810 since the first electric motor MG1 is stopped during the EV running.

According to this example, the electronic control device 50 makes the first ring gear Rf and the second ring gear Rr non-rotatable by the brake B1 to perform the series HV running for running with the power of the second electric motor MG2 while the first electric motor MG1 generates electricity from the power of the engine 12 without mechanically transmitting the power of the engine 12 to the drive wheels 30. Therefore, an improvement in fuel efficiency of the vehicle 8 can be achieved by making the first ring gear Rf and the second ring gear Rr non-rotatable by the brake B1 in a running state in which favorable fuel efficiency can be acquired from the series HV running.

According to this example, the electronic control device 50 releases the brake B1 to perform the parallel HV running for running with the power of the engine 12 and the second electric motor MG2. Therefore, an improvement in fuel efficiency of the vehicle 8 can be achieved by releasing the brake B1 in a running state in which favorable fuel efficiency can be acquired from the parallel HV running.

According to this example, if the engine 12 is started during EV running, the electronic control device 50 causes the first electric motor MG1 to rotate the engine 12 for cranking while the first ring gear Rf and the second ring gear Rr are kept non-rotatable by the brake B1. Therefore, an influence of a series of controls provided at the engine start such as cranking and an ignition start of the engine 12 on the vehicle speed V or the drive force of the vehicle 8 can easily be interrupted by the brake B1. For example, since the electronic control device 50 does not have to control the second electric motor MG2 for cranking of the engine 12 and can perform the cranking of the engine 12 through control of the first electric motor MG1, the engine rotation speed Ne can easily be controlled during the cranking. Although vibration from the engine 12 is easily generated during the cranking at the engine start, the transmission of the engine vibration during the cranking to the drive wheels 30 is significantly suppressed because the brake B1 is engaged.

According to this example, if the brake B1 is released after the start of the engine 12, the electronic control device 50 controls the first electric motor MG1 before release of the brake B1 such that the torque (arrow AR61) applied to the brake B1 due to the power of the engine 12 reaches the magnitude balancing with the torque (arrow AR62) applied to the brake B1 due to the running load (running resistance) as depicted in FIG. 19(c). Therefore, the electronic control device 50 can reduce the shock that may occur when the brake B1 is released.

According to this example, if the engine 12 is stopped during the parallel HV running, as depicted in FIG. 18, the electronic control device 50 controls the first electric motor MG1 and the second electric motor MG2 such that the rotation speed of the first ring gear Rf and the second ring gear Rr comes closer to zero, then actuates the brake B1 to make the first ring gear Rf and the second ring gear Rr non-rotatable, i.e., engages the brake B1, and stops the engine 12 after completion of the engagement actuation of the brake B1. Therefore, the electronic control device 50 can reduce the shock from the brake B1 that may occur when the brake B1 is engaged, and the shock that may occur when the engine 12 is switched from the drive state to the non-drive state.

Although the example of the present invention has been described in detail with reference to the drawings, this is merely an embodiment and the present invention can be implemented in variously modified and improved forms based on the knowledge of those skilled in the art.

For example, although the brake B1 is a wet multi-plate type hydraulic friction engagement device in the example, the brake B1 is not particularly limited in terms of an operation form as long as the brake is a power connecting/disconnecting device that can connect/disconnect power transmission, and may be a dry brake or may be magnetic powder type, electric magnetic type, and mechanical type engagement devices such as a powder (magnetic powder) brake, an electromagnetic brake, and a meshing type dog brake.

Although the brake B1 is engaged to suppress the rotation of the first ring gear Rf and the rotation of the second ring gear Rr in the example, the brake B1 may be a brake in a form of suppressing the rotation of the first ring gear Rf and the rotation of the second ring gear Rr through actuation other than the engagement actuation.

Although the vehicle drive device 10 includes the brake B1 in the example, the brake B1 may not be included. This is because the parallel HV running can be performed even without the brake B1.

Figure 25:
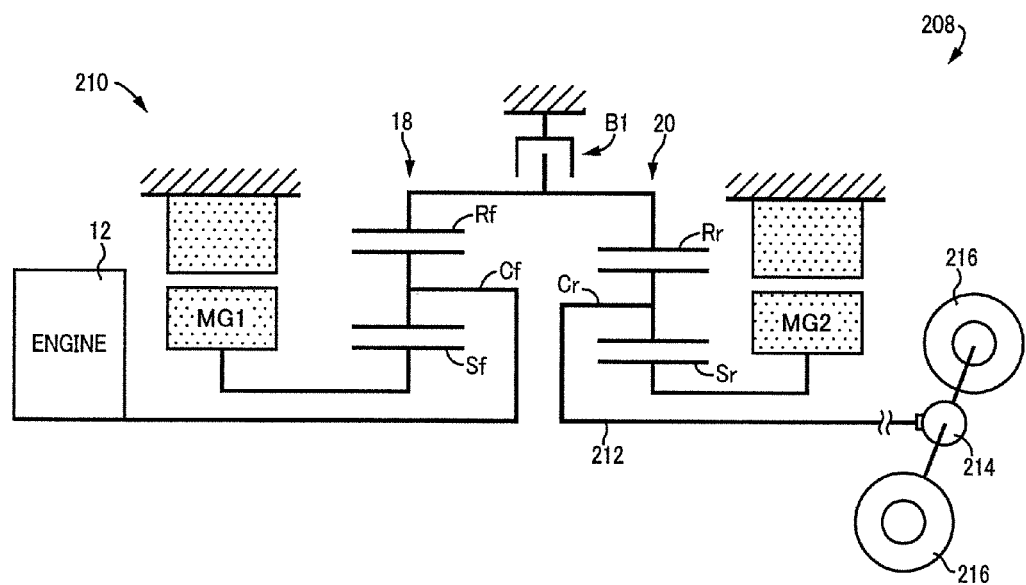
FIG. 25 is a skeleton diagram of the vehicle drive device indicating the first variation relative to FIG. 1.

Although the vehicle drive device 10 of FIG. 1 is a drive device transversely mounted on a front side of the front-wheel drive, i.e., FF (front-engine front-drive) type vehicle 8 in the example, the vehicle drive device 10 may be replaced with a vehicle drive device 210 preferably used in an FR (front-engine rear-drive) type vehicle 208 as depicted in a skeleton diagram of FIG. 25. Although the vehicle drive device 210 is basically the same as the vehicle drive device 10 of FIG. 1, the vehicle drive device 210 is different from the vehicle drive device 10 of FIG. 1 in that the second carrier Cr of the second planetary gear device 20 is coupled to a propeller shaft 212. Therefore, in the vehicle 208 of FIG. 25, power from the second carrier Cr is transmitted sequentially through the propeller shaft 212, a differential gear device 214, a pair of axles, etc. to a pair of drive wheels 216.

Figure 26:
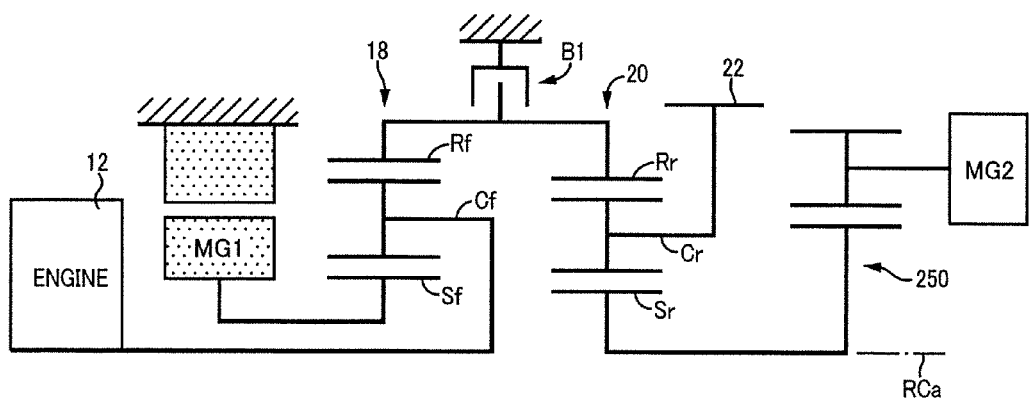
FIG. 26 is a skeleton diagram of the vehicle drive device indicating the second variation relative to FIG. 1.

Although the second sun gear Sr of the second planetary gear device 20 is coupled to rotate at the rotation speed same as the second electric motor MG2 in the example, a reduction gear 250 may be interposed between the second sun gear Sr and the second electric motor MG2 as depicted in a skeleton diagram of FIG. 26. Even if the reduction gear 250 is interposed between the second sun gear Sr and the second electric motor MG2, the second sun gear Sr and the second electric motor MG2 are still coupled to each other.

Figure 27:
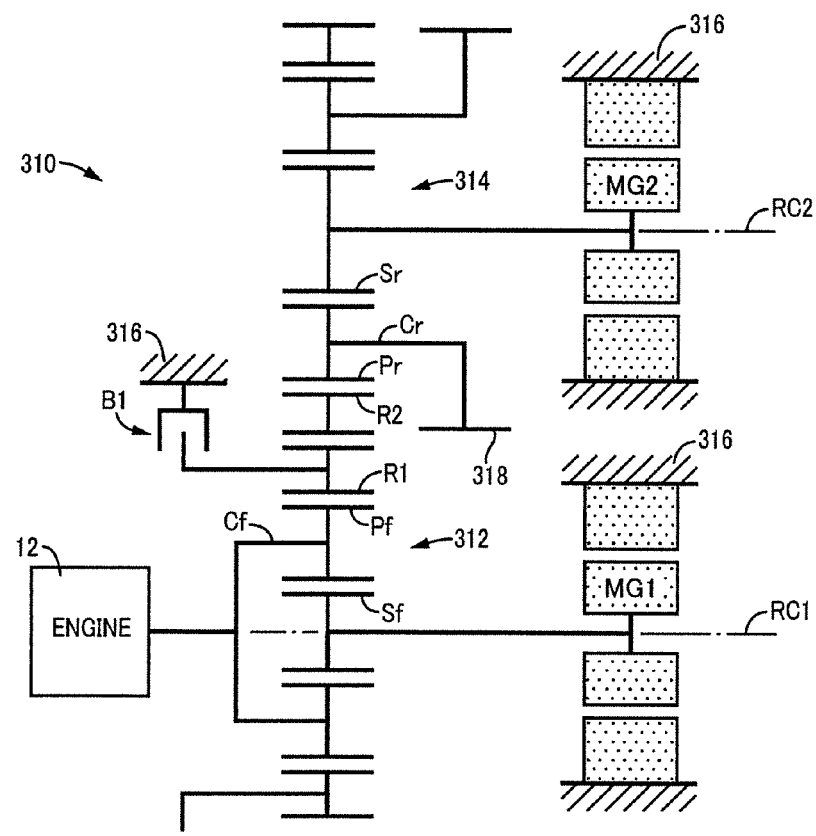
FIG. 27 is a skeleton diagram of the vehicle drive device indicating the third variation relative to FIG. 1.
Figure 28:
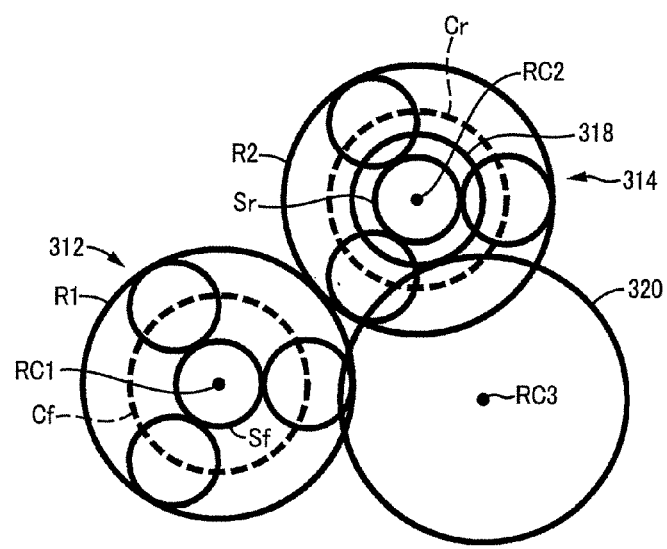
FIG. 28 is a diagram of the vehicle drive device of FIG. 27 viewed in the direction of a rotation axis of the engine and is a schematic of a relative positional relationship of three axes included in the vehicle drive device.

Although the engine 12, the first electric motor MG1, the first planetary gear device 18, the second planetary gear device 20, and the second electric motor MG2 are disposed on the common axis RCa in FIG. 1 of the example, these elements may be disposed on axes different from each other. For example, a vehicle drive device 310 depicted in FIGS. 27 and 28 is conceivable. FIG. 27 is a skeleton diagram of the engine 12, the first electric motor MG1, a first planetary gear device 312, a second planetary gear device 314, and the second electric motor MG2 included in the vehicle drive device 310 deployed on a plane. FIG. 28 is a diagram of the vehicle drive device 310 viewed in the direction of a rotation axis (first rotation axis RC1) of the engine 12 and is a schematic of a relative positional relationship of axes RC1, RC2, and RC3 included in the vehicle drive device 310. As depicted in FIGS. 27 and 28, the axes RC1, RC2, and RC3 are parallel to each other. The first axis RC1 is an axis of the engine 12 etc.; the second axis RC2 is an axis of the second electric motor MG2 etc.; and the third axis RC3 is an axis of a differential gear device distributing power from the vehicle drive device 310 to the pair of the drive wheels 30. As depicted in FIG. 27, the vehicle drive device 310 includes the engine 12, the first planetary gear device 312, the first electric motor MG1, and the brake B1 on the first axis RC1, and includes the second planetary gear device 314 and the second electric motor MG2 on the second axis RC2. Although the first planetary gear device 312 and the second planetary gear device 314 are basically the same as the first planetary gear device 18 and the second planetary gear device 20, respectively, of FIG. 1, the first planetary gear device 312 is different from the first planetary gear device 18 in that the first ring gear R1 is included instead of the first ring gear Rf and the second planetary gear device 314 is different from the second planetary gear device 20 in that the second ring gear R2 is included instead of the second ring gear Rr. As depicted in FIG. 27, both the first ring gear R1 of the first planetary gear device 312 and the second ring gear R2 of the second planetary gear device 20 include outer circumferential teeth along with inner circumferential teeth meshed with the pinion gears Pf and Pr, and the outer circumferential teeth of the first ring gear R1 and the outer circumferential teeth of the second ring gear R2 are meshed with each other. The brake B1 is interposed between the first ring gear R1 and a transaxle case 316 that is a non-rotating member and selectively couples the first ring gear R1 and the transaxle case 316. Since the outer circumferential teeth of the first ring gear R1 and the outer circumferential teeth of the second ring gear R2 are meshed with each other, the brake B1 is engaged to suppress not only the rotation of the first ring gear R1 but also the rotation of the second ring gear Rr. In the second planetary gear device 314, the second carrier Cr is coupled to a drive pinion 318 corresponding to the output gear 22. The drive pinion 318 is meshed with a differential ring gear 320 (see FIG. 28) included in the differential gear device on the third axis RC3 and power output from the drive pinion 318 is transmitted sequentially through the differential gear device and a pair of the axles 26 to the pair of the drive wheels 30.

Figure 29:
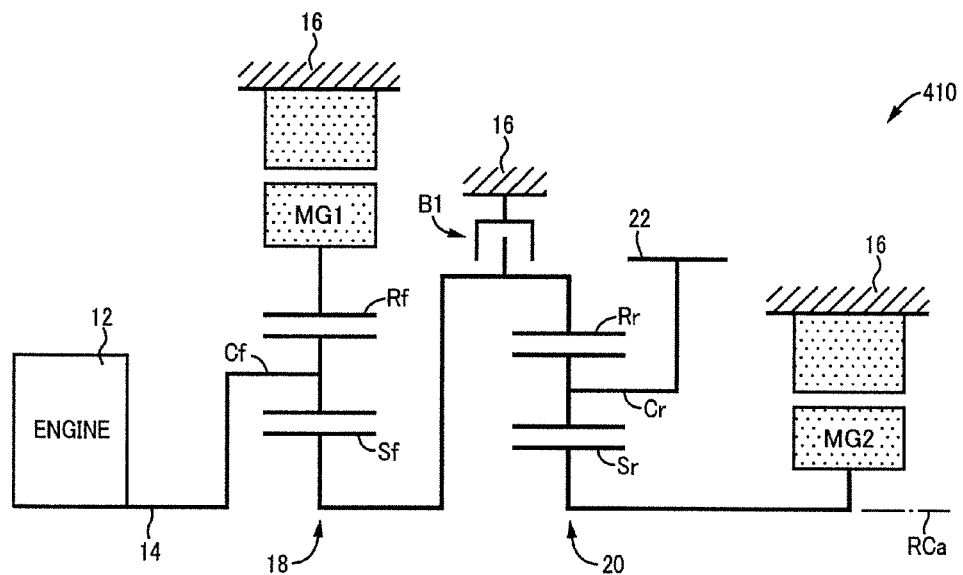
FIG. 29 is a skeleton diagram of the vehicle drive device indicating the fourth variation relative to FIG. 1.
Figure 30:
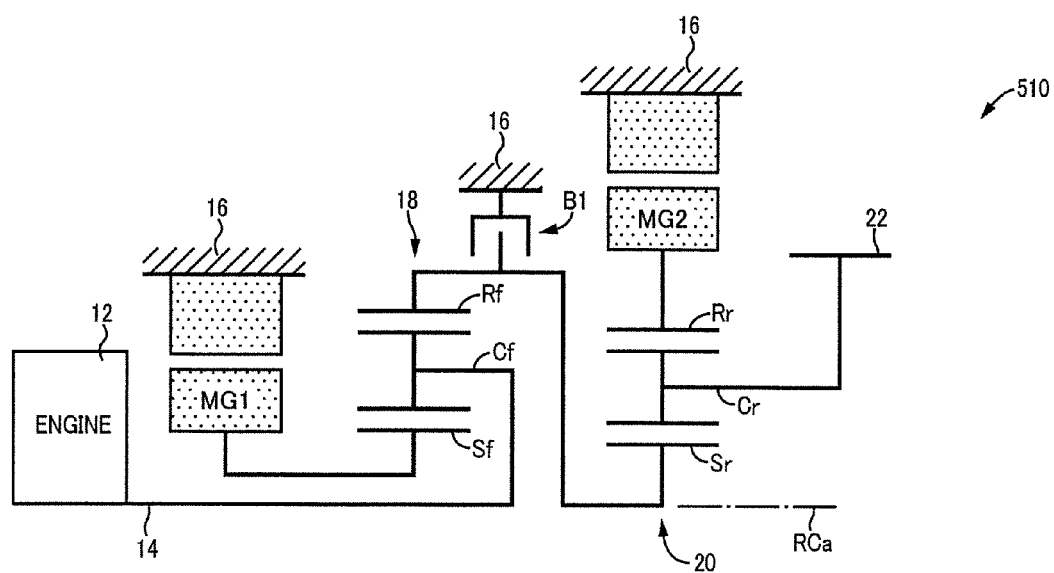
FIG. 30 is a skeleton diagram of the vehicle drive device indicating the fifth variation relative to FIG. 1.
Figure 31:
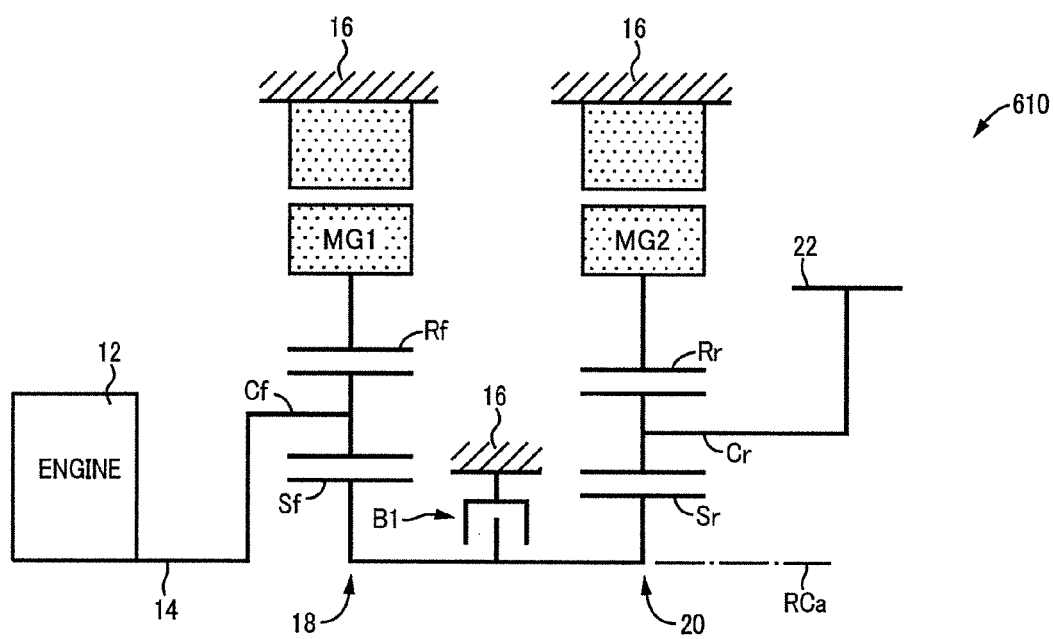
FIG. 31 is a skeleton diagram of the vehicle drive device indicating the sixth variation relative to FIG. 1.

Although the members etc. coupled to the rotating elements of the first planetary gear device 18 and the second planetary gear device 20 are as depicted in FIG. 1 in the example, the vehicle drive device 10 may be replaced with a vehicle drive device having a portion of the members etc. coupled to the rotating elements different from FIG. 1. For example, vehicle drive devices 410, 510, and 610 depicted in FIGS. 29 to 31 are conceivable as examples of replacing the vehicle drive device 10. The vehicle drive device 410 of FIG. 29 is different from the vehicle drive device 10 of FIG. 1 in that the first sun gear Sf of the first planetary gear device 18 is coupled to the second ring gear Rr of the second planetary gear device 20 and that the first ring gear Rf of the first planetary gear device 18 is coupled to the first electric motor MG1. In the vehicle drive device 410, the first sun gear Sf and the second ring gear Rr are coupled to each other and, therefore, the brake B1 is interposed between the case 16 and the first sun gear Sf/the second ring gear Rr and selectively couples the case 16 to the first sun gear Sf and the second ring gear Rr. The vehicle drive device 410 is the same as the vehicle drive device 10 of FIG. 1 except these points.

The vehicle drive device 510 of FIG. 30 is different from the vehicle drive device 10 of FIG. 1 in that the first ring gear Rf of the first planetary gear device 18 is coupled to the second sun gear Sr of the second planetary gear device 20 and that the second ring gear Rr of the second planetary gear device 20 is coupled to the second electric motor MG2. In the vehicle drive device 510, the first ring gear Rf and the second sun gear Sr are coupled to each other and, therefore, the brake B1 is interposed between the case 16 and the first ring gear Rf/the second sun gear Sr and selectively couples the case 16 to the first ring gear Rf and the second sun gear Sr. The vehicle drive device 510 is the same as the vehicle drive device 10 of FIG. 1 except these points.

The vehicle drive device 610 of FIG. 31 is different from the vehicle drive device 10 of FIG. 1 in that the first sun gear Sf of the first planetary gear device 18 is coupled to the second sun gear Sr of the second planetary gear device 20 and that the first ring gear Rf of the first planetary gear device 18 is coupled to the first electric motor MG1 and the second ring gear Rr of the second planetary gear device 20 is coupled to the second electric motor MG2. In the vehicle drive device 610, the first sun gear Sf and the second sun gear Sr are coupled to each other and, therefore, the brake B1 is interposed between the case 16 and the first sun gear Sf/the second sun gear Sr and selectively couples the case 16 to the first sun gear Sf and the second sun gear Sr. The vehicle drive device 610 is the same as the vehicle drive device 10 of FIG. 1 except these points.

Figure 32:
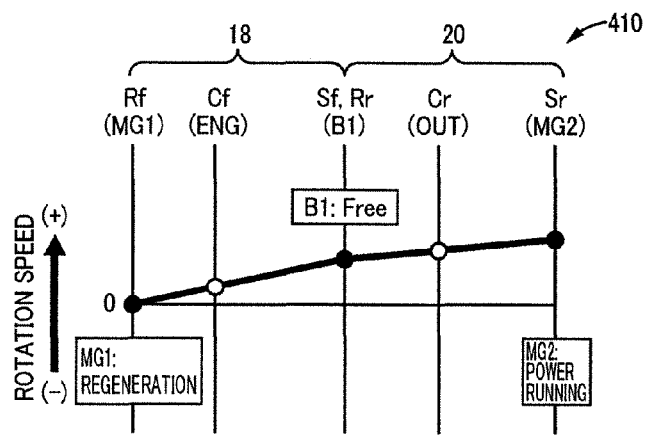
FIG. 32 is a collinear diagram of the vehicle drive device of FIG. 29.
Figure 33:
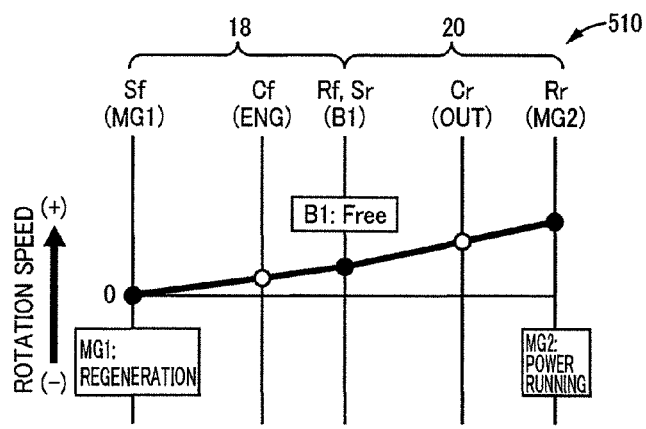
FIG. 33 is a collinear diagram of the vehicle drive device of FIG. 30.
Figure 34:
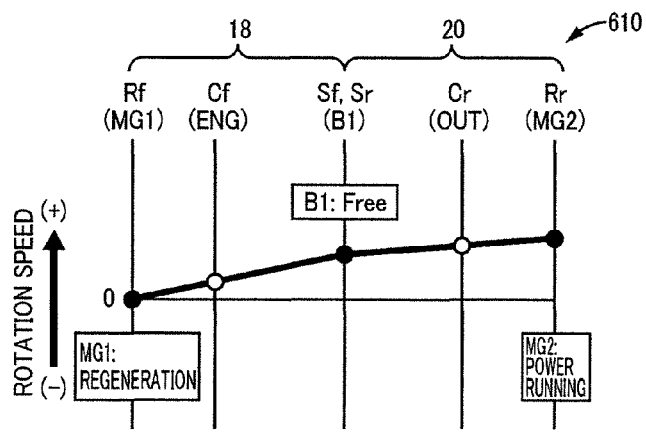
FIG. 34 is a collinear diagram of the vehicle drive device of FIG. 31.

For example, collinear diagrams of the vehicle drive devices 410, 510, and 610 corresponding to the collinear diagram of the vehicle drive device 10 depicted in FIG. 21(b) are FIG. 32 for the vehicle drive device 410, FIG. 33 for the vehicle drive device 510, and FIG. 34 for the vehicle drive device 610. As can be seen from the collinear diagrams of FIGS. 32 to 34, in each of the vehicle drive devices 410, 510, and 610, the electronic control device 50 can change the second electric motor rotation speed Nm to arbitrarily control the rotation direction of the first electric motor MG1 regardless of the engine rotation speed Ne and the vehicle speed V as is the case with the vehicle drive device 10, and therefore can cause the first electric motor MG1 to perform the regenerative operation while allowing zero rotation or positive rotation thereof, and can cause the second electric motor MG2 to perform power running. Thus, the occurrence of the power circulation can advantageously be reduced in each of the vehicle drive devices 410, 510, and 610, as is the case with the vehicle drive device 10.

Although both the first planetary gear device 18 and the second planetary gear device 20 are of the single pinion type in the example, one or both of the devices may be of the double pinion type.

Although the first electric motor MG1 and the first sun gear Sf of the first planetary gear device 18 integrally rotate in FIG. 1 of the example, a reduction gear etc. may be interposed between the first electric motor MG1 and the first sun gear Sf as in the case of the reduction gear 250 of FIG. 26 for the second electric motor MG2. The same applies to the engine 12 and a reduction gear etc. may be interposed between the engine 12 and the first carrier Cf.

NOMENCLATURE OF ELEMENTS 8, 208: vehicle 10, 210, 310, 410, 510, 610: vehicle drive device 12: engine 18, 312: first planetary gear device 20, 314: second planetary gear device 30, 216: drive wheels 50: electronic control device (control device) MG1: first electric motor MG2: second electric motor B1: brake Sf: first sun gear (one first planetary gear device constituent member) Pf: first pinion gear Cf: first carrier Rf, R1: first ring gear (the other first planetary gear device constituent member) Sr: second sun gear (the other second planetary gear device constituent member) Pr: second pinion gear Cr: second carrier Rr, R2: second ring gear (one second planetary gear device constituent member)

The invention claimed is:

1. A vehicle drive device having an engine, a first electric motor, and a second electric motor comprising:
   a first planetary gear device including a first sun gear, a first ring gear, and a first carrier coupled to the engine; and
   a second planetary gear device including a second sun gear, a second ring gear, and a second carrier coupled to drive wheels,
   one first planetary gear device constituent member of the first sun gear and the first ring gear being coupled to only the first electric motor, the other first planetary gear device constituent member of the first sun gear and the first ring gear being coupled to one second planetary gear device constituent member of the second sun gear and the second ring gear, the other second planetary gear device constituent member of the second sun gear and the second ring gear being coupled to the second electric motor,
   a brake suppressing rotation of the other first planetary gear device constituent member and rotation of the one second planetary gear device constituent member, and
   a control device making the other first planetary gear device constituent member and the one second planetary gear device constituent member non-rotatable by the brake to perform electric motor running for running with power of the second electric motor while the engine is put into a non-drive state,
   when the engine is started during the electric motor running, the control device causing the first electric motor to rotate the engine while the other first planetary gear device constituent member and the one second planetary gear device constituent member are kept non-rotatable by the brake, and
   when the brake is released after start of the engine, the control device controlling the first electric motor before release of the brake such that a torque applied to the brake due to power of the engine reaches a magnitude balancing with a torque applied to the brake due to a running load.

2. The vehicle drive device of claim 1, wherein
   the control device makes the other first planetary gear device constituent member and the one second planetary gear device constituent member non-rotatable by the brake to perform series hybrid running for running with power of the second electric motor while the first electric motor generates electricity from power of the engine without power of the engine being mechanically transmitted to the drive wheels.

3. The vehicle drive device of claim 1, wherein
   the control device releases the brake to perform parallel hybrid running for running with power of the engine and the second electric motor.

4. The vehicle drive device of claim 3, wherein
   if the engine is stopped during the parallel hybrid running, the control device controls the first electric motor and the second electric motor such that a rotation speed of the other first planetary gear device constituent member and the one second planetary gear device constituent member comes closer to zero, then actuates the brake to make the other first planetary gear device constituent member and the one second planetary gear device constituent member non-rotatable, and stops the engine after completion of actuation of the brake.

\* \* \* \* \*